US005509810A

United States Patent [19]
Schertz et al.

[11] Patent Number: 5,509,810
[45] Date of Patent: Apr. 23, 1996

[54] INTERACTIVE NEONATAL RESUSCITATION TRAINING SIMULATOR AND METHOD

[75] Inventors: Mitchell Schertz, West Hempstead; Robert R. Richards, Bloomingburg, both of N.Y.

[73] Assignee: Rofeh Simulations Limited, West Hempstead, N.Y.

[21] Appl. No.: 13,820

[22] Filed: Feb. 4, 1993

[51] Int. Cl.$^6$ .................................................. G09B 23/28
[52] U.S. Cl. ........................ 434/262; 434/265; 434/365; 901/1; 128/774; 364/413.01
[58] Field of Search ...................................... 434/262, 265, 434/267, 268, 257, 365, 369, 396; 273/454, 460; 901/1; 601/41; 446/285; 128/774; 385/80; 364/413.01, 578

[56] References Cited

U.S. PATENT DOCUMENTS

| | | | |
|---|---|---|---|
| 3,520,071 | 7/1970 | Abrahamson et al. | 434/267 |
| 3,662,076 | 5/1972 | Gordon et al. | |
| 3,874,093 | 1/1975 | Garbe . | |
| 3,947,974 | 4/1976 | Gordon et al. | |
| 4,331,426 | 5/1982 | Sweney | 434/265 |
| 4,360,345 | 11/1982 | Hon | 434/262 |
| 4,588,383 | 5/1986 | Parker et al. | 434/265 |
| 4,601,665 | 7/1986 | Messmore | 434/267 |
| 4,611,998 | 9/1986 | Ramamurthy | 434/265 |
| 4,797,104 | 1/1989 | Laerdal et al. | 434/265 |
| 4,828,501 | 5/1989 | Ingenito et al. | 434/265 |
| 4,915,635 | 4/1990 | Ingenito et al. | 434/396 |
| 4,932,879 | 6/1990 | Ingenito et al. | 434/262 |
| 5,021,878 | 6/1991 | Lang | 901/1 X |
| 5,061,188 | 10/1991 | McCollum | 434/267 |
| 5,083,962 | 1/1992 | Pracas | 446/184 |
| 5,084,922 | 2/1992 | Louit | 5/81.1 |

OTHER PUBLICATIONS

"As Better Training and Machines Improve Safety, Speed Becomes Focus of Newest Anesthetic Drugs", JAMA, vol. 267, No. 12, p. 1576, Mar. 1992.

Gaba et al., "A Comprehensive Anesthesia Simulation Environment: Recreating the Operating Room for Research and Training," Anesthesiology vol. 69, No. 3, pp. 387–394, Sep. 1988.

Schwid et al., "The Anesthesia Simulator–Recorder: A Device to Train and Evaluate Anesthesiologists' Responses to Critical Incidents," vol. 72, No. 1, pp. 191–197, Jan. 1990.

Desch et al., "Comparison of a Computer Tutorial With Other Methods for Teaching Well–Newborn Care," AJDC, vol. 145, pp. 1255–1258, Nov. 1991.

Part VI: Neonatal Advanced Life Support, JAMA, vol. 255, No. 21, pp. 2969–2973, Jun. 1986.

Koka, Babu V., M.D., "Cardiac Arrest Simulation Program," The New England Journal of Medicine, vol. 311, No. 1389–1390, Nov. 1984.

Roseman, Byron D., M.D. "Neonatal Resuscitation," JAMA, vol. 257, No. 2, p. 254, Jan. 1987.

(List continued on next page.)

Primary Examiner—Joe H. Cheng
Attorney, Agent, or Firm—Heslin & Rothenberg

[57] ABSTRACT

An interactive neonatal resuscitation training simulator and method employing an infant android of life-like appearance and response. The android has an intelligent, interactive control mechanism which: simulates a condition within the android corresponding to a human condition requiring resuscitation; detects and evaluates resuscitation activity on the android by a trainee employing the simulator; and adjusts the android's simulated condition in response to the trainee's resuscitation effort. The adjustment made by the intelligent, interactive control mechanism mimics a predetermined human reaction to a resuscitation effort such as that made by the trainee. The simulator also includes a neonatal workstation and a virtual reality environment enclosure. In appearance, the workstation is an approximate replication of an actual resuscitation workstation typically found in a hospital delivery room. The virtual reality enclosure audiovisually simulates a working environment of a typical delivery room during an actual neonatal resuscitation process. The simulator and method provide a trainee with "real-life" clinical experience in neonatal resuscitation.

68 Claims, 28 Drawing Sheets

OTHER PUBLICATIONS

Curley et al., "Pediatric Resuscitatin: Mock Code," MCN, vol. 12, pp. 277–280, Jul./Aug. 1987.

Vaughan, Victor C. III, M.D., "Mannequins for Enhancing Skills in Pediatric Procedrues," Pediatrics in Review, vol. 13, No. 1, p. 244, Jul. 1992.

"Textbook of Neonatal Resuscitation", American Heart Association, American Academy of Pediatrics, 1990.

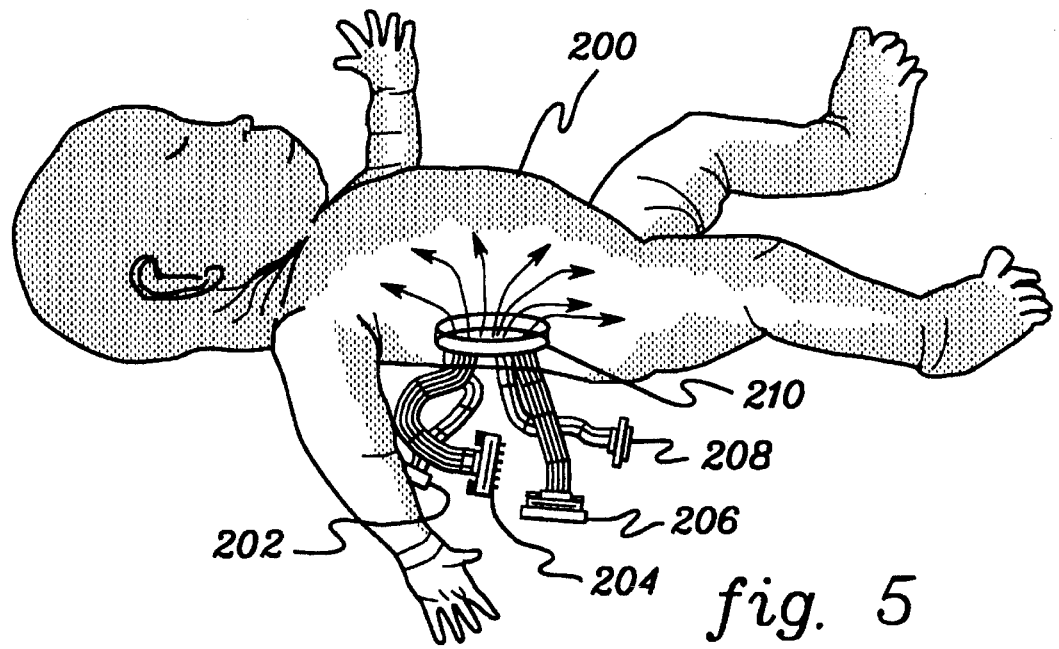
fig. 5
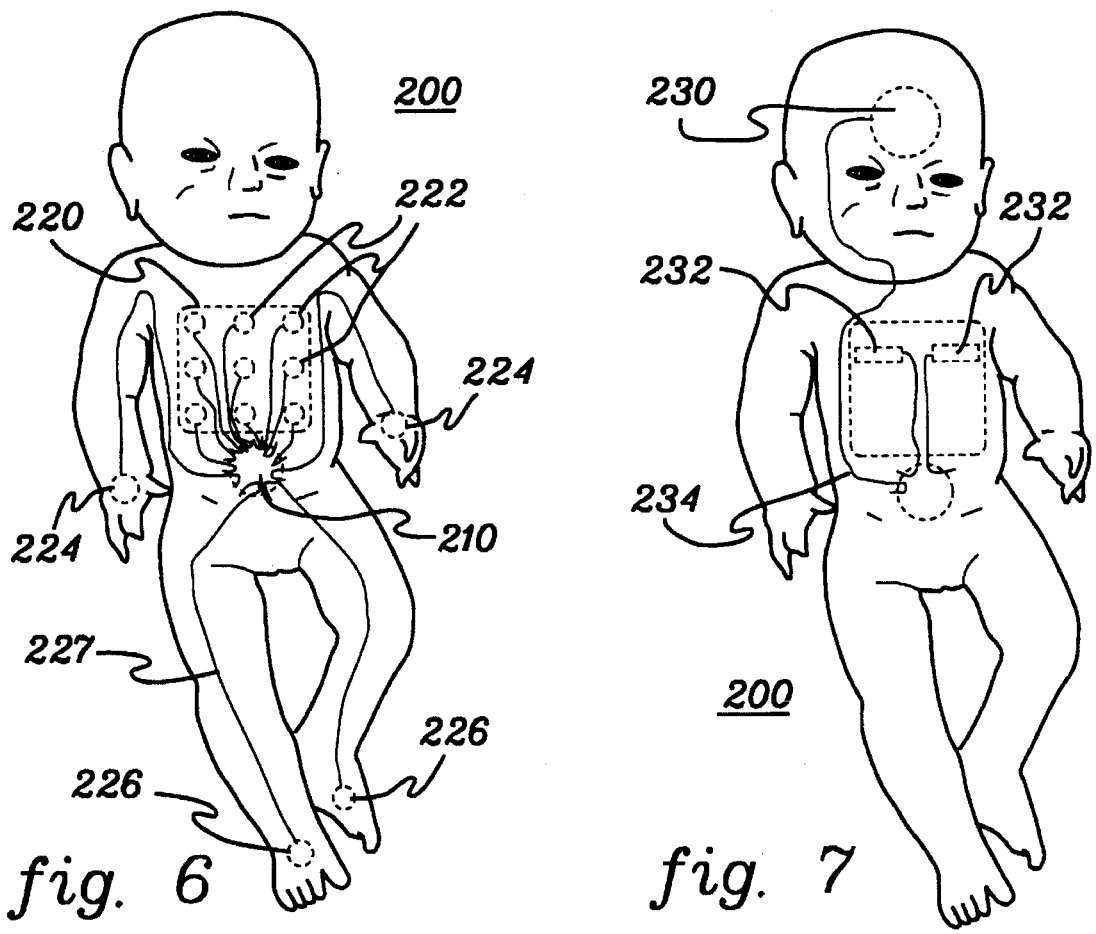
fig. 6
fig. 7

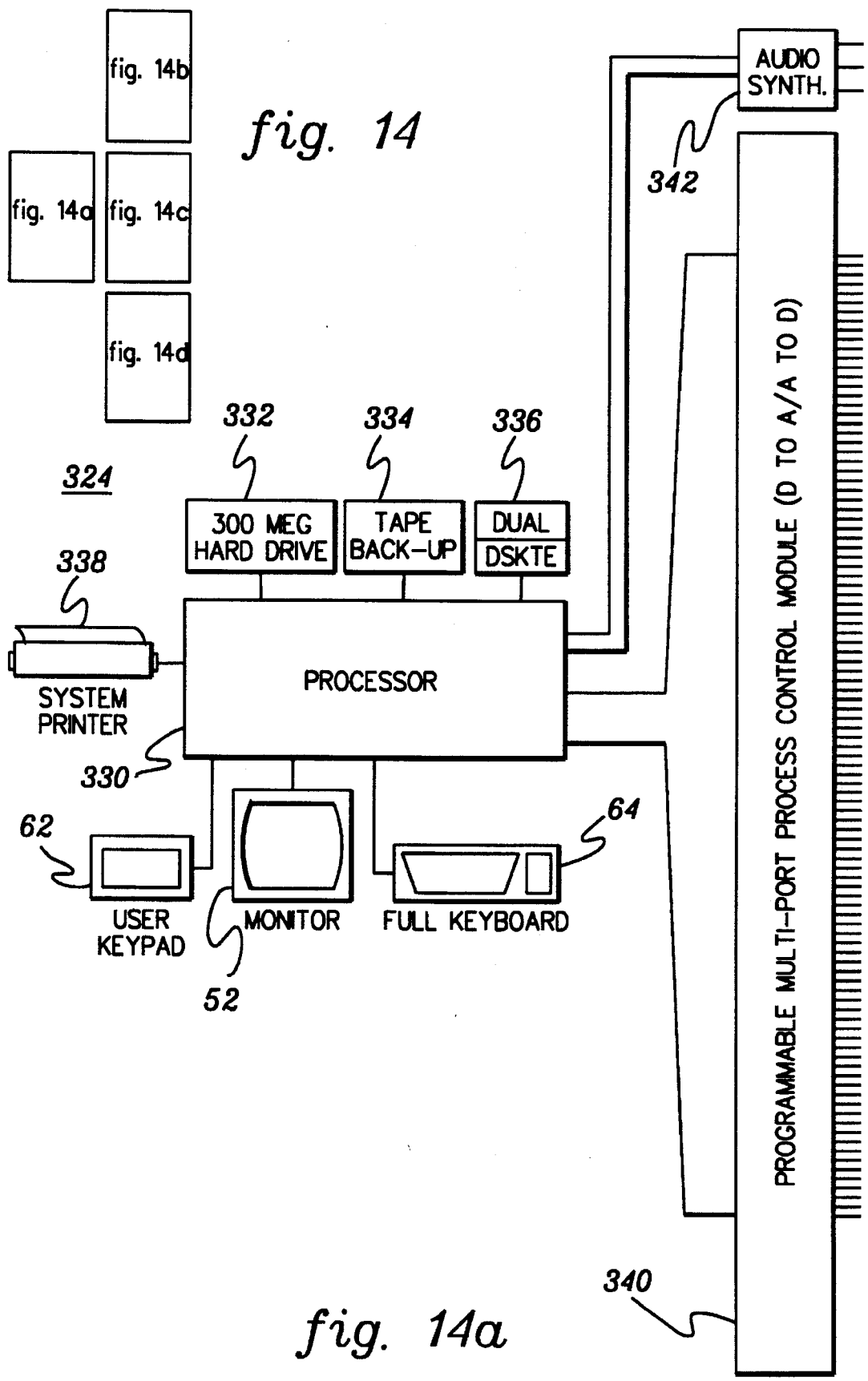

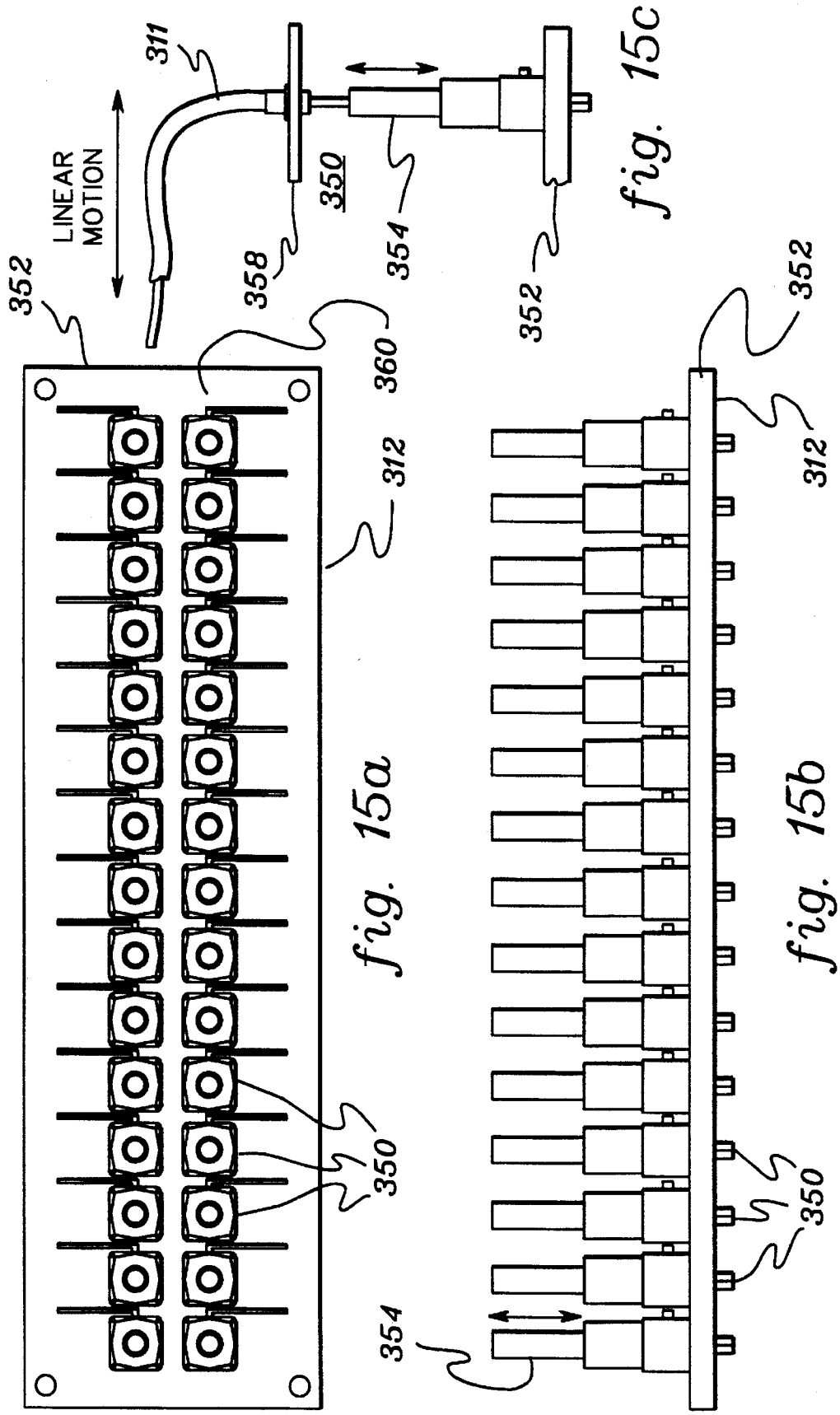

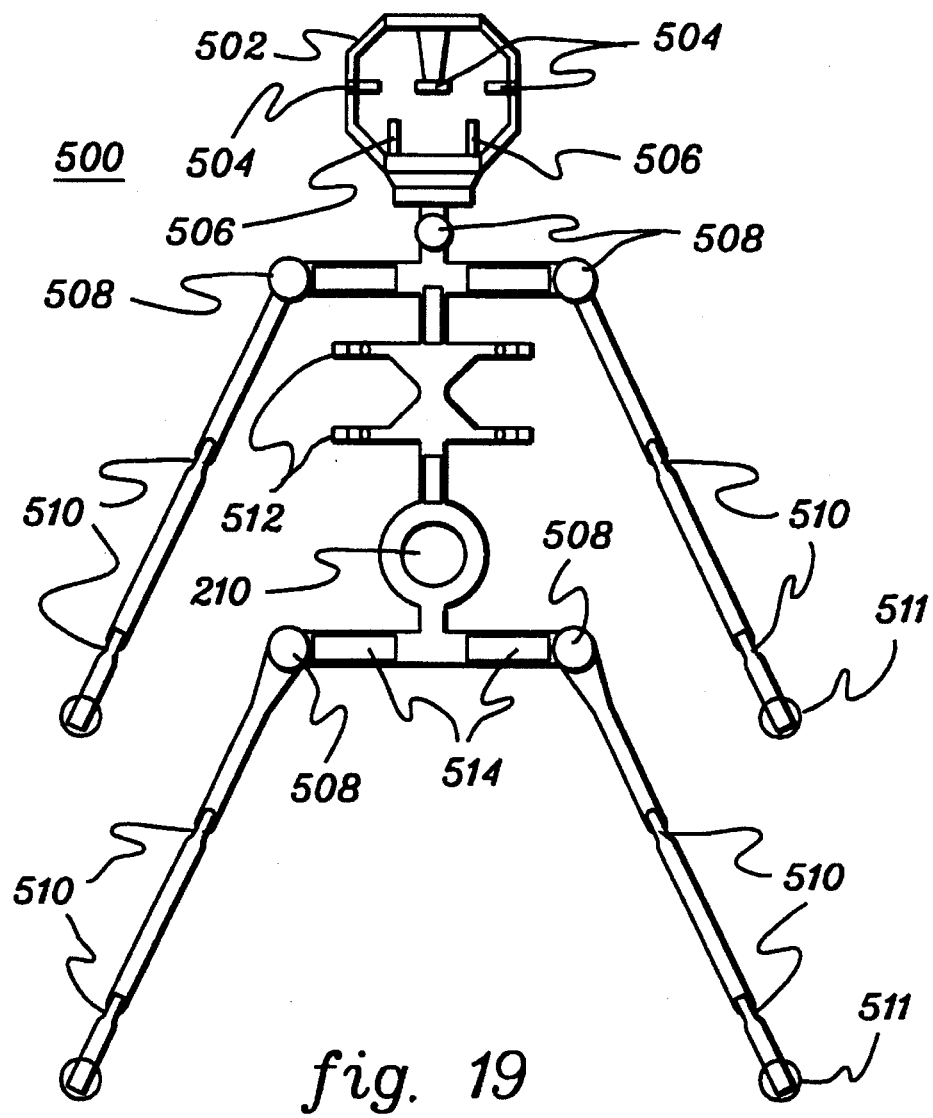
fig. 19
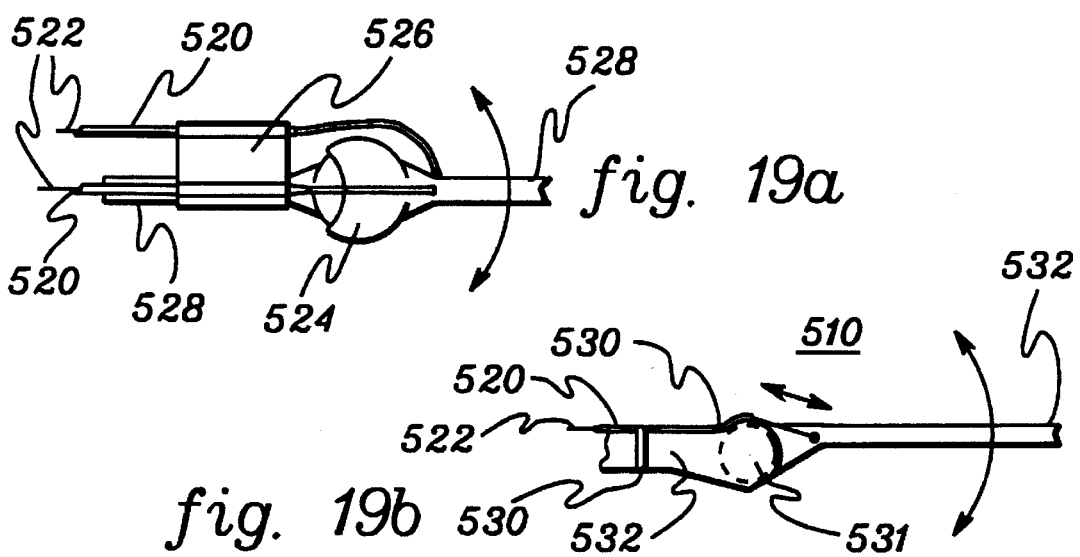
fig. 19a
fig. 19b

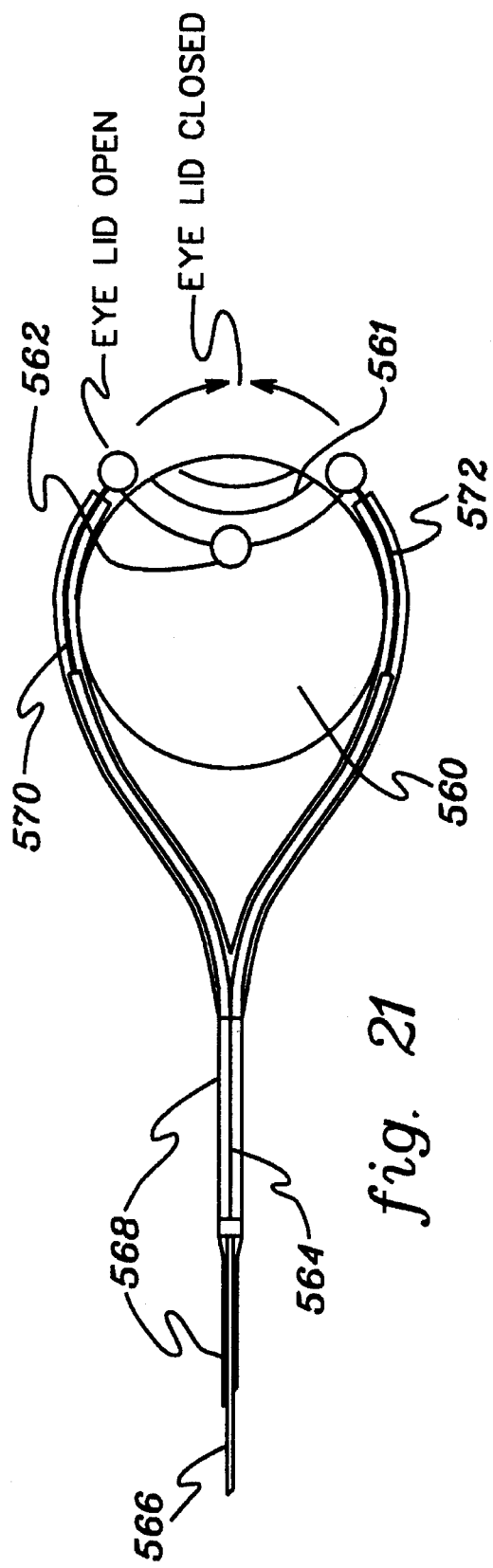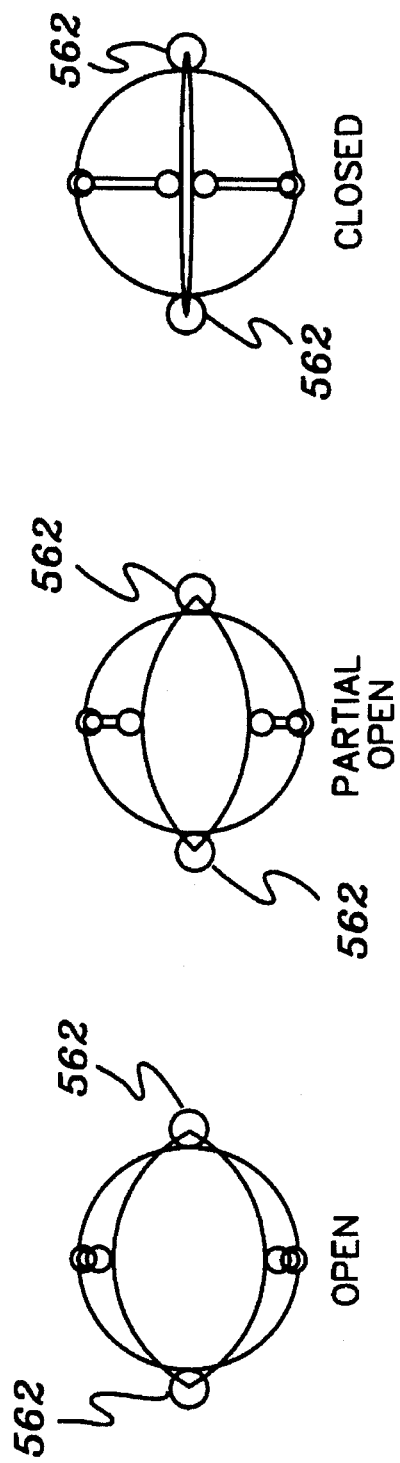

INTERACTIVE NEONATAL RESUSCITATION TRAINING SIMULATOR AND METHOD

TECHNICAL FIELD

The present invention relates in general to medical training simulators, and more particularly, to an intelligent, interactive neonatal resuscitation training simulator and method employing an infant android of life-like appearance and response.

BACKGROUND ART

In the United States there are approximately 5,000 hospitals with delivery services in which approximately 3.7 million babies are born each year. Resuscitation is required for a significant number of these babies. Current research suggests that resuscitation is necessary for about 80 percent of the 30,000 babies with birth weights less than 1500 grams, and for an unspecified additional number of babies weighing more than 1500 grams at birth. Thus, asphyxia continues to be a major neonatal problem, with resuscitation frequently being required in institutions without specialized neonatal expertise. This challenge has been recognized by both the American Heart Association (AHA) and the American Academy of Pediatrics (AAP).

The Working Group on Pediatric Resuscitation, formed in 1978 under the auspices of the Emergency Cardiac Care Committee (ECC) of AHA, has developed guidelines for neonatal resuscitation. Further, a National Conference on Pediatric Resuscitation was convened in December, 1983 under the auspices of AHA, and one of their conclusions was that a training program for neonatal advanced life support was urgently needed. ECC's guidelines for neonatal resuscitation were updated in 1985 and endorsed by AAP. One of the stated goals of the guidelines is that "at least one person skilled in neonatal resuscitation should be in attendance at every delivery. An additional skilled person should be readily available . . ."

As at outgrowth of this work, a neonatal resuscitation course, by Bloom et al. entitled *Textbook of Neonatal Resuscitation*, (1987, 1990), has been jointly produced and made available by the American Heart Association and the American Academy of Pediatrics. The goal of the neonatal resuscitation course is to provide the materials and training necessary (according to AHA-AAP guidelines) for health professionals in the neonatal resuscitation field. Obviously, competent performance of resuscitation procedure is a matter of major importance since mistakes can result in injury or even death. For this reason, training and the use of training devices must be closely monitored by experts in neonatal resuscitation instruction. Supervised clinical experience is regarded as a prerequisite for any individual who is to assume responsibility for a portion of a neonatal resuscitation. The purpose of the present invention is to facilitate this instruction.

The interactive neonatal resuscitation simulator and method presented herein provide a trainee with a life-like simulation of a resuscitation process on a newborn infant, and in particular, a life-like simulation of what an attending physician would experience while resuscitating a newborn infant at a resuscitation station within a hospital's delivery room.

DISCLOSURE OF INVENTION

Briefly summarized, the present invention provides in a basic aspect an interactive human resuscitation training simulator which includes an android having an intelligent, interactive control mechanism. The control mechanism includes systems for simulating within the android a condition corresponding to a human condition requiring resuscitation, along with feedback systems for detecting and evaluating resuscitation activities on the android by a student employing the simulator. The control mechanism then adjusts the android's simulated condition in response to the student's resuscitation activities as sensed by the feedback system. The adjustment mimics a predetermined human reaction to resuscitation activity such as that performed on the android by the student employing the simulator.

In enhanced embodiments, the android is equipped with life-like human appearance and life-like human responses. Further, a resuscitation workstation having the appearance of a conventional resuscitation workstation is employed to present a more real-life simulation to the trainee. In a more specific embodiment, a virtual reality environment is created through the use one or more audiovisual system(s) which project prerecorded sights and sounds of a hospital room during an actual taped resuscitation procedure. Additional specific details of the simulator are also presented and claimed herein.

In another basic aspect, a method for conducting an interactive resuscitation training simulation is set forth. The method includes the steps of: providing an android having a life-like human appearance; simulating within the android asphyxiation; detecting resuscitation activities on the android by a trainee; evaluating in real time the trainee resuscitation activities; and adjusting the android's simulated condition in response to the trainees resuscitation activities. The adjustment in the android simulated condition mimics a predetermined human reaction to resuscitation activity such as that performed on the android by the trainee.

To restate, the interactive neonatal resuscitation training simulator and method presented employ an infant android of life-life appearance and response. The goal is to provide a trainee with a "real-life" clinical experience in resuscitation to enhance the trainee's learning experience and improve upon existing teaching methodologies. The simulator may be employed for certification and/or recertification of a trainee in neonatal resuscitation. By using the simulator, physicians and their associates gain knowledge which will directly impact on and reduce the error rate for resuscitation procedures performed today. The simulator provides an active, dynamic environment in which a trainee learns proper resuscitation in a variety of situations. This is accomplished by approximating the real working conditions, for example, in a delivery room of a hospital, during a resuscitation process and providing the trainee with accurate and timely feedback on the resuscitation procedure.

BRIEF DESCRIPTION OF DRAWINGS

These and other objects, advantages and features of the present invention will be more readily understood from the following detailed description of certain preferred embodiments of the present invention, when considered in conjunction with the accompanying drawings in which:

FIG. 5 is a perspective view of a robotic infant (or android) pursuant to the present invention wherein cable connections for one embodiment of the automaton are shown;

FIG. 6 is a plan view of one embodiment of pressure sensor layout for the robotic infant of FIG. 5;

FIG. 7 is a plan view of one embodiment of speaker placement for the robotic infant of FIG. 5;

FIGS. 14a–14d depict a high level schematic of a computer system control pursuant to the present invention, wherein one embodiment of input/output control lines is shown;

FIG. 15a is a plan view of one embodiment of a linear servo motion system pursuant to the present invention;

FIG. 15b is a side elevational view of the linear servo motion system of FIG. 15a;

FIG. 15c is an enlarged side elevational view of a single linear servo motor depicted in FIGS. 15a and 15b;

FIG. 19 is a plan view of a specific skeletal structure for a robotic infant pursuant to the present invention;

FIGS. 19a & 19b depict a dual axis motion joint and a single axis motion joint, respectively, for a robotic infant pursuant to the present invention;

FIG. 21 is a side elevational view of one embodiment of an eye motion system for a robotic infant pursuant to the present invention;

FIGS. 21a–21c depict front elevational views of the eye motion system of FIG. 21, wherein the eye is shown in open, partially open and closed positions, respectively;

BEST MODE FOR CARRYING OUT THE INVENTION

In general, the interactive neonatal resuscitation training simulator and training method of the present invention are designed to present a life-like simulation of the resuscitation process of a newly born infant. The system accurately simulates what an attending physician might encounter when resuscitating a newborn infant within a hospital delivery room.

The neonatal resuscitation simulation training system includes the following major components: (1) a neonatal workstation; (2) a robotic infant; (3) a virtual reality environment enclosure; (4) a robotics system; and (5) supporting/controlling system software. Each of these components is described in detail herein with reference to the accompanying drawings, wherein the same reference numbers are used throughout multiple figures to designate the same or similar components.

Workstation and Enclosure

Figure 1:
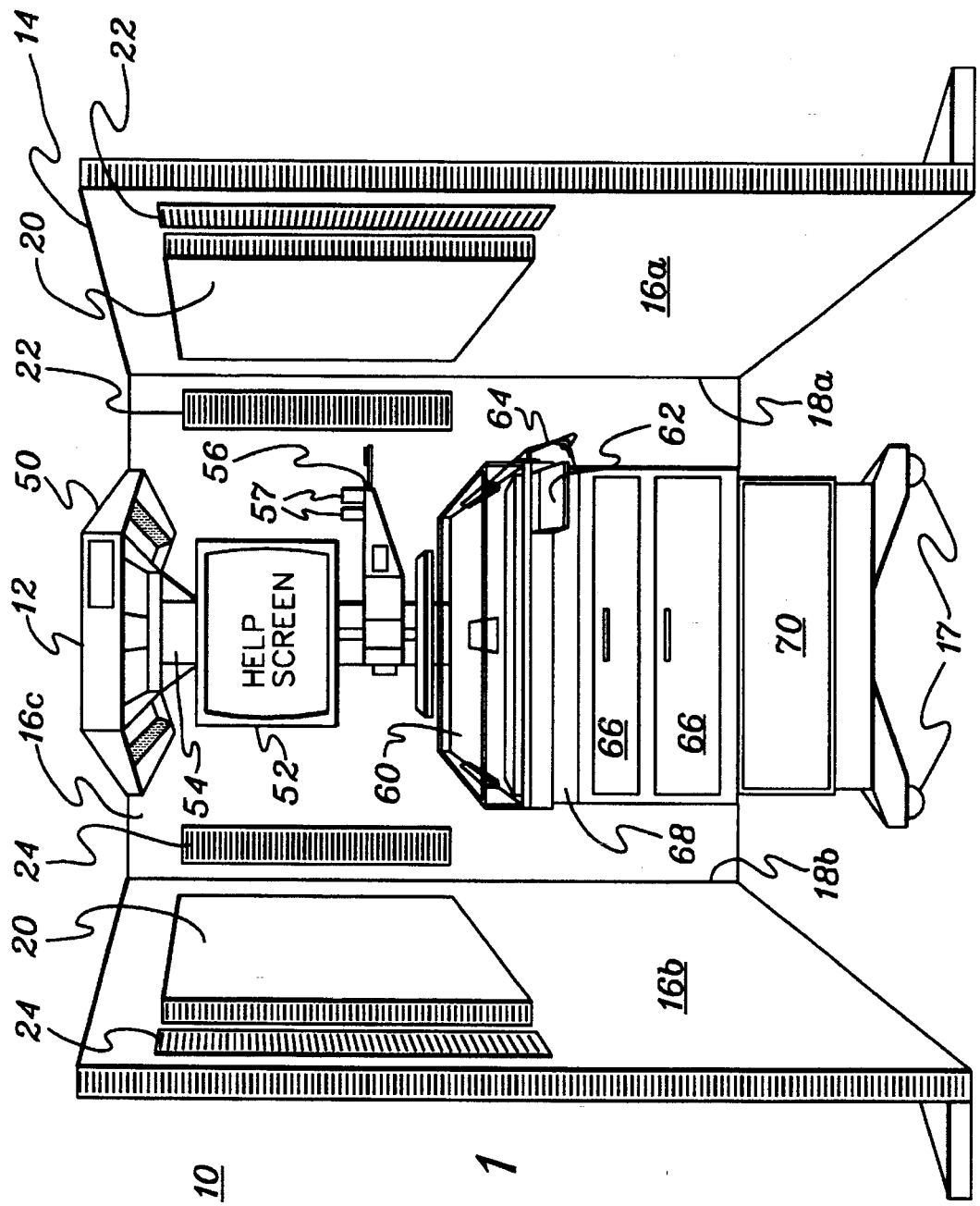
FIG. 1 is a perspective view of one embodiment of resuscitation workstation and virtual reality enclosure components of an interactive neonatal resuscitation simulator pursuant to the present invention.

FIG. 1 depicts a neonatal resuscitation simulation and training system, generally denoted 10, pursuant to the present invention. System 10 includes a resuscitation workstation 12 disposed within a virtual reality environment enclosure 14. The purpose of enclosure 14 is to simulate the working environment within a typical delivery room during an actual neonatal resuscitation process. In the particular embodiment depicted, enveloping enclosure 14 includes two side panels 16a, 16b and a back panel 16c. Preferably, side panels 16a, 16b pivotally connect at edges 18a, 18b to back panel 16c for selective collapsing of the enclosure as described below.

Figure 2:
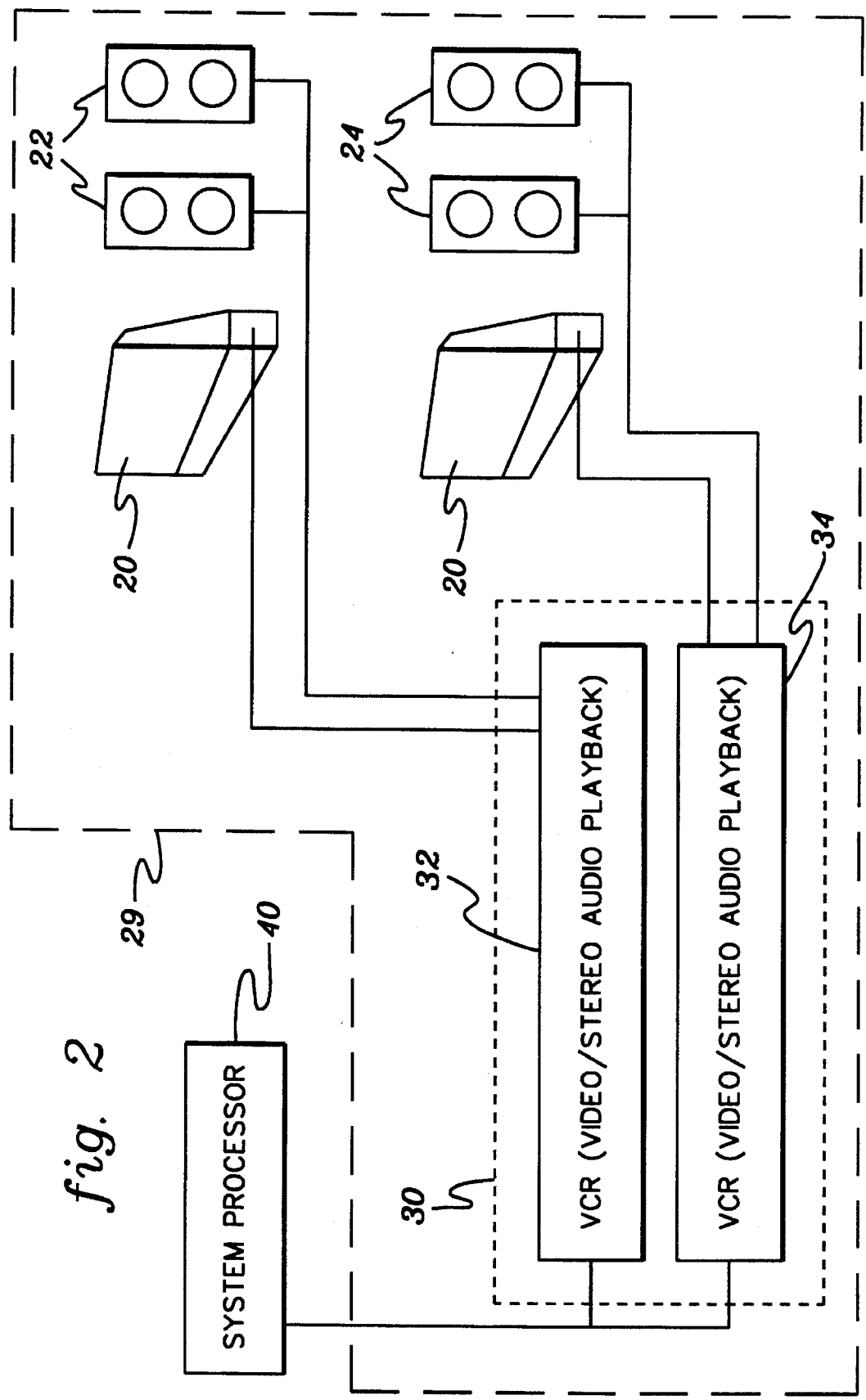
FIG. 2 is a block diagram representation of a virtual reality environmental system for a simulator pursuant to the present invention.

Visually, a virtual reality environment is generated by two large projection TV systems 20, each of which is disposed on one of side panels 16a, 16b of enclosure 14. Additionally, a stereophonic audio system having two speakers 22, 24 is associated with each projection TV system. The audio systems are employed to playback actual delivery room sounds during a neonatal resuscitation procedure, and may be mounted on the hinged/movable side panels 16a, 16b and back panel 16c as shown in FIG. 1. Two audiovisual systems are preferably employed to enhance the reality of the enclosure by providing a left side and right side environment. The virtual reality environment sub-system, denoted 29, is shown in greater detail in FIG. 2.

Virtual reality sub-system 29 consists of a dual deck video cassette player 30, two rear projection TV systems 20 and their associated stereophonic audio systems 22 & 24. A first TV system 20 and its associated audio system 22 are connected as shown to a first video/stereo audio playback component 32 of the dual deck cassette player 30, and a second TV system 20 and its associated audio system 24 are connected to a second video/stereo audio playback component 34 of the dual deck cassette player 30. Player 30, which has start, stop and rewind tape control functions, is started at the beginning of a simulation by a system processor 40 (e.g., positioned in the base of the resuscitation workstation 12 (FIG. 1)). Tape play may be for approximately 30 minutes per cassette which would accommodate approximately five resuscitation training sessions before having to be rewound for replay.

Returning to FIG. 1, resuscitation workstation 12 is to the extent possible a faithful replication of an actual resuscitation workstation found within a hospital delivery room. This is to assist in presenting a true-to-life simulation. Workstation 12, depicted in greater detail in FIGS. 3a–3c, includes an upper section 50, which conventionally contains a radiant heating system used to warm the outer surface of a newborn under temperature control. As described below (FIG. 3c), however, section 50 of workstation 12 is employed as part of an ultra-violet lighting system which assists in a color change "illusion" of an infant android positioned on a supporting surface 60 of workstation 12.

Below section 50 in the center of an overhead structure support frame 54 is a large (e.g., 20 inch diagonal) VGA color display system 52. Display system 52 is under computer control and provides help information to an attending physician during a simulation process. This system is tutorial for the user and instructs the trainee on how to set up and start the simulation process. Preferably, prompting or assistance to the person being trained is also provided while the simulation is underway. Below display system 52 is a resuscitation instrument arm 56 which holds breathing assist apparatus and suctioning devices 57 for use during the simulation process. Arm 56 is identical in form to what is found in an actual resuscitation workstation. Next is infant support bed 60 where a robotic infant (i.e., android; see FIGS. 5–12b) is located on the surface, preferably with its head to the front in the same manner as in an actual live resuscitation procedure.

At the front of infant work surface 60 is a small touch-sensitive keypad 62 which is used by the person operating the simulator and experiencing the simulation. Keypad 62 allows the operator to control starting, stopping and selecting of tape simulation scenarios to be experienced. To the right of user keypad 62 is a full computer compatible keyboard 64 mounted on a swing out frame. Keypad 62 and keyboard 64 are described below in greater detail with reference to FIG. 3b & 3c, respectively.

Finally, workstation 12 includes two drawers 66 at the front of a base portion 68. Drawers 66 house the various instruments and devices, which may be necessary during a resuscitation process, normally found at an actual resuscitation workstation. Preferably, the drawers are "half depth" in order to provide room for an internal computer system (FIGS. 14a–14d) which is to control the simulator. The bottom blank panel 70 is an access panel to the internal computer system.

Figure 3A:
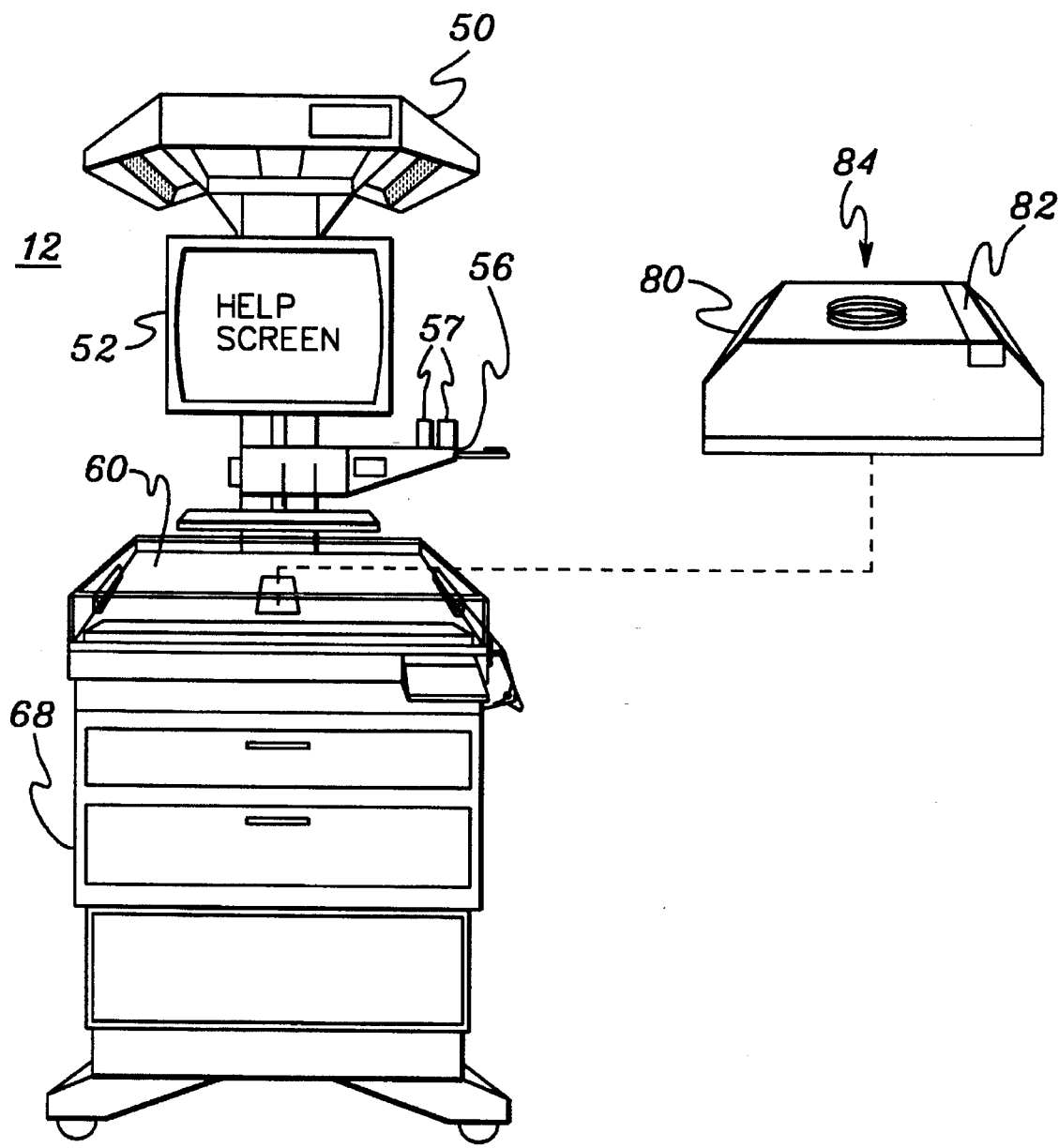
FIG. 3a is a perspective view of the resuscitation workstation of FIG. 1 in combination with an infant atomizer pursuant to the present invention.

Referring to FIG. 3a, an infant android atomizer 80 is preferably provided to cover an infant android (FIGS. 5–12b) with a thin film of moisture (e.g., distilled water), and thereby simulate an infant's skin condition immediately following delivery. Atomizer 80, fabricated for example of a lightweight plastic, consists of a fluid reservoir 82 and a hand pump 84 which is used to "spray" an infant android with distilled water. Multiple depressions of the hand pump mechanism may be required to adequately cover the infant android with a water film. This moisturizing operation can be performed by a "system administrator" or by the medical professional using the simulator.

Figure 3B:
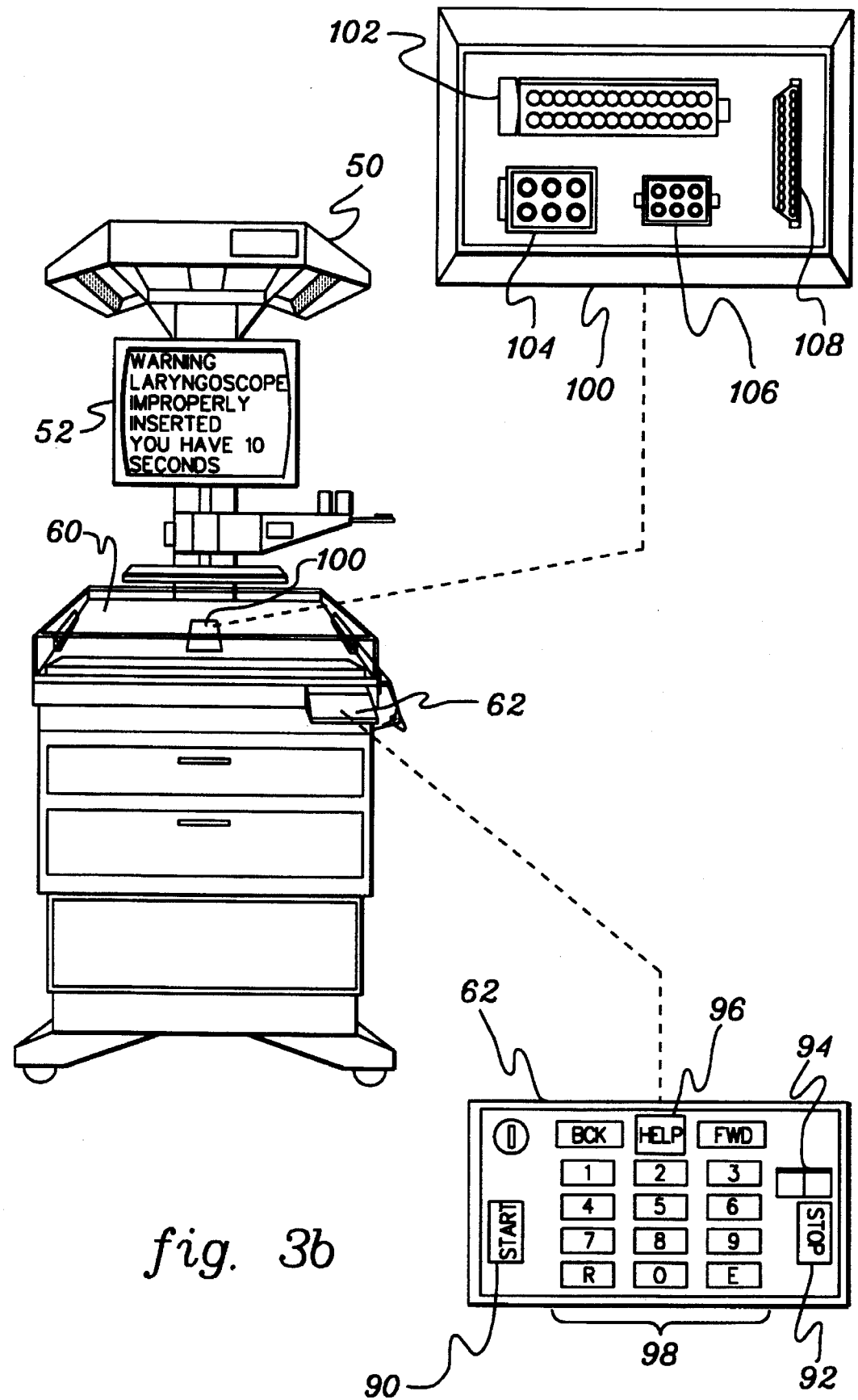
FIG. 3b is a perspective view of the resuscitation workstation of FIG. 1 wherein a robotic infant connector well and a user keypad are depicted in expanded view.

FIG. 3b depicts in detail one embodiment of user keypad 62. Keypad 62 includes a start simulation scenario control 90, a stop simulation control 92, a scenario select display control 94, a help screen control 96, and training scenario selection pads 98. Preferably, keypad 62 is a touch-sensitive membrane keypad which is stain resistant and waterproof. Again, this keypad is the main control panel which a person operating the simulator employs to interface with the system.

Recessed within infant support surface 60 is a connector well 100 which contains various connectors for the automation systems within the infant android (FIGS. 5–12b). In the embodiment depicted and described herein, well 100 has motion cable connectors 102, fluidics connectors 104, pneumatics connectors 106 and electrical (small signal) connectors 108. These connectors provide all electrical, motion, fluidic and pneumatic connections between the robotic infant and the main processing and control systems located within the workstation. The connectors are preferably recessed in well 100 such that the infant android will lie flat upon the workstation support surface 60. (Each set of connectors is discussed in detail below.)

Figure 3C:
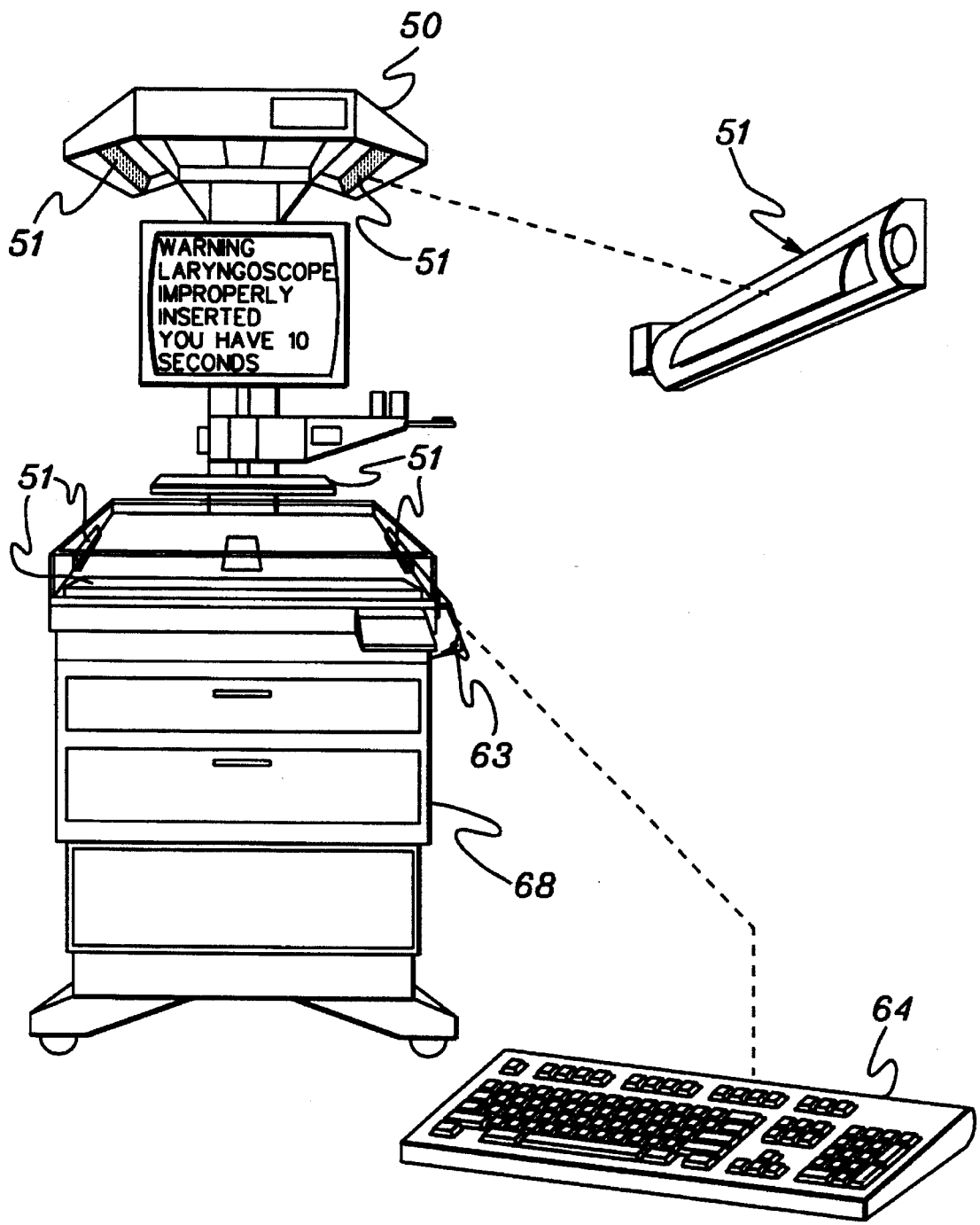
FIG. 3c is a perspective view of the resuscitation workstation of FIG. 1 wherein a lighting system and a control keyboard layout are depicted in expanded view.

FIG. 3c depicts one embodiment of a system keyboard 64 for the system administrator. This keyboard comprises a standard 101 keyboard and is disposed to the right of user keypad 62. Keyboard 64 is preferably mounted to a swing out frame 63 for easy use by the system administrator in preparing a simulation exercise. Keyboard 64 may also be used to access a series of self-diagnostics to test the entire system prior to beginning a simulation to ensure proper operation. Maintenance technicians will also use this keyboard for any routine and special maintenance requirements. The keyboard may be locked out of the way during training sessions to prevent inadvertent activation of undesired functions.

As already noted, an ultra-violet lighting system 51 is partially disposed within upper section 50 of workstation 12. In one embodiment, ultra-violet lighting system 51 comprises six lamps disposed as shown in FIG. 3c. These lamps are controlled by a servo motor controlled shutter (not shown) which itself is under control of the main processor (FIGS. 14a–14d) in the base 68 of workstation 12. The ultra-violet lighting system utilizes 15 watt fluorescent lamps, which predominantly have "black light" output in the ultra-violet (UV) spectrum.

Figure 4A:
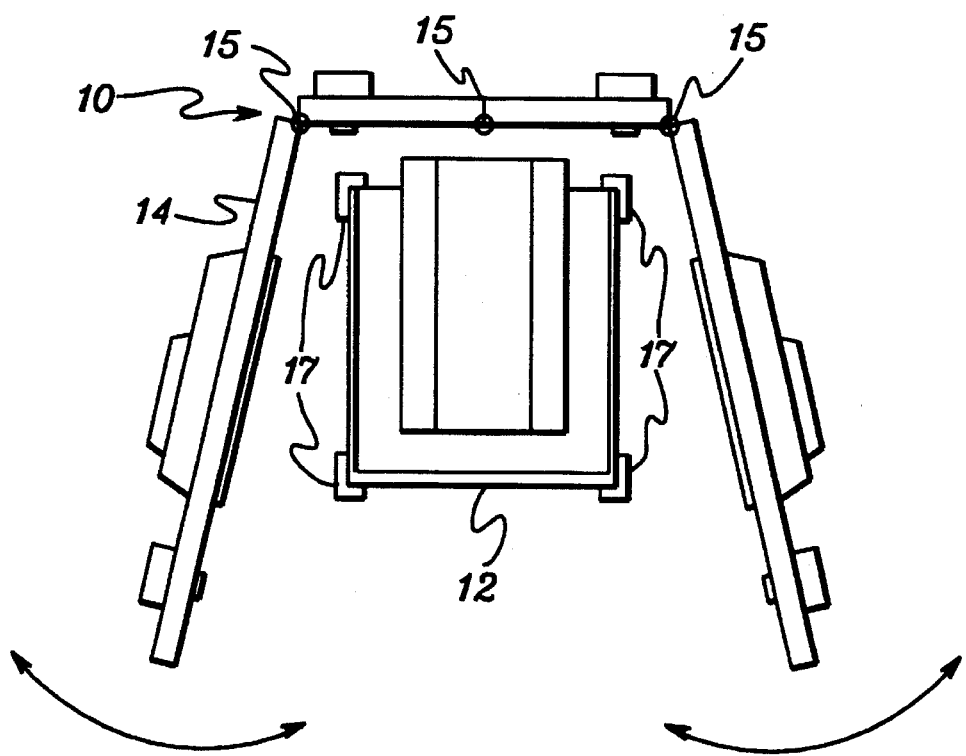
FIG. 4a is a top plan view of one embodiment of the resuscitation workstation and virtual reality enclosure of FIG. 1 shown in an operative setup.
Figure 4B:
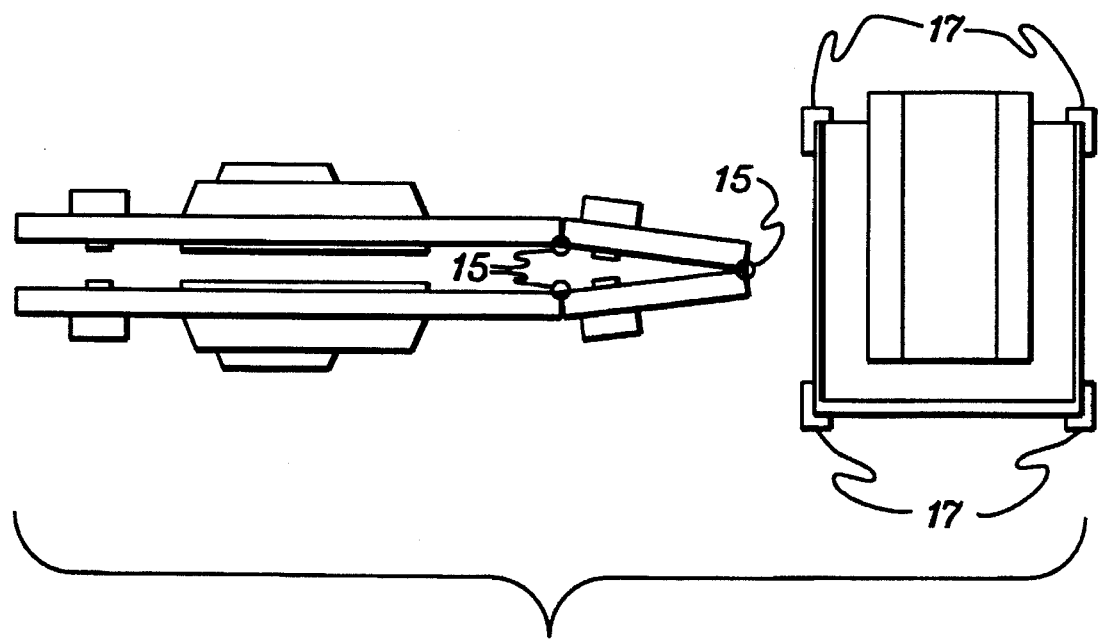
FIG. 4b is a top plan view of the resuscitation workstation and virtual reality enclosure of FIG. 1 shown collapsed for storage.

FIG. 4a is a top plan view of an operative setup of resuscitation workstation 12 and virtual reality enclosure 14 of system 10. Preferably, workstation 12 is movable (for example, the workstation could be placed on rollers 17) and the associated virtual reality enclosure 14 is collapsible in order to minimize storage space when the simulation system 10 is not in use. "Slide away" storage of workstation 12 and environment 14 is shown in FIG. 4b. Enclosure 14 is preferably hinged at three locations 15 in order that it may be readily folded as illustrated in FIG. 4b for storage. Each unit is preferably supported by ball casters, such as casters 17 supporting workstation 12.

Robotic Infant

The robotic infant (RI), described below with reference to FIGS. 5–12b, is a life-like representation of an actual newborn infant. Various length and color infants will preferably be available. The RI is positioned on the workstation's 12 support surface 60 (FIG. 1) head to the front and on its back, as would be expected of any newborn infant needing resuscitation. The robotic infant is connected to the simulation system via a series of "umbilical" cables exiting from the base of the spine of the android and coupling to the connectors in well 100 in the workstation's infant support surface 60 (FIG. 1). These umbilical cables are flexible and long enough to permit "handling" of the RI as would normally be required during a resuscitation process.

Numerous automation systems are embodied within the robotic infant in order to present a life-like infant android with life-like actions/reactions during the resuscitation procedure. The techniques employed by the present invention include:

1) Full RI motion of the head, facial elements, chest and limbs accomplished by a linear action servo system via control cable motion transmission.

2) Fluidics system which manages and controls the excretion of fluids from the infant (through the nose, mouth and anal passage) and monitors the insertion of fluids via the umbilical stub.

3) Pressure sensing system which detects the application of pressure on the RI during the resuscitation process. The points monitored are the underside of both hands and feet as well as multiple points on the chest and upper abdomen.

4) Internal Body Sounds (heartbeat). Two low frequency audio transponders in the chest create a left side or right side heart beat.

5) Throat Insertion Sensing. A series of sensors are located within a "throat tube mechanism" which detects the insertion of instruments (laryngoscopes etc.) during the resuscitation process. These sensors detect the actual position of the inserted instrument to verify proper application and use.

6) Anatomical Throat Representation. When the throat is viewed via a laryngoscope, the medical professional will "see" a replication of the throat internals. This is partially accomplished by a throat tube wall coating material such that when viewed through a laryngoscope, the throat appears as expected.

7) Vocal Sounds are created via a small speaker located within the head (and rear of the upper throat tube mechanism) of the RI. This speaker is driven via an audio synthesizer (as part of the system's processor) and replicates the expected vocal sounds of a newborn.

8) Pneumatics System, which is a control system for the fluidics system. This system controls the excretion of RI fluids.

9) Color Change System. There are two techniques employed to create the expected color change of a newborn during resuscitation. The first technique is via the external "black-light" system (discussed above). The second technique is a "color controlled," shaped strip which makes up the lips of the RI. The black light system utilizes deep UV lighting from six light sources mounted on the workstation at specific locations. These light sources, when activated (via a shutter mechanism) "excite" UV (ultra-violet) sensitive particles preferably imbedded within the surface material of the RI. When excited, these particles change their color to a blue-tint and thereby create the illusion of skin surface color change. The six light sources are under control of the processor so that an "uneven" color change can be created to replicate the expected color change during resuscitation. Additionally, various concentrations of UV particles are located on the RI skin surface to enhance the blue-tint intensity at selected locations. The color controlled, shaped strips (lips) are included to accentuate the color change of the lips during resuscitation. This is under processor control and is activated and controlled by a current change through the color variant material. This additional color system is preferably included since lip color is an important queue to determining a newborn's reaction to a resuscitation process.

Skin Surface Material. This is a latex compound which has a texture replicating the "feel" of a newborn's skin. Additionally, the natural color of the material is such that the fully resuscitated newborn color of pink, light brown or dark brown can be fabricated.

All control systems for the RI (e.g., motion servos, pumps, etc.) are located external to the RI so that the internal mechanisms of the RI are as simple as possible and "quiet" during operation. The quietness of operation is important so that no false audio queues are inadvertently created during the RI's resuscitation which would disturb the "illusion" of life-like action and reaction.

Referring now to FIGS. 5–12b, one detailed embodiment of a robotic infant, denoted 200, pursuant to the present invention is discussed below.

FIG. 5 illustrates input and output cable links between RI 200 and the main system processor (not shown), i.e., via the well connectors (102, 104, 106, 108) in the infant support surface of workstation 12 (FIG. 3b). These cables, which by way of example may be approximately 8 inches in length, include a motion control interface connector 202, a fluidics connector 204, a pneumatics connector 206, and a small signal electrical connector 208. The cables enter RI 200 through a cable way 210 (e.g., a section of nylon "skeleton" in the back of RI 200) and interface with the corresponding mating halves located within the "connector well" on the work surface of the resuscitation workstation (i.e., motion cable connectors 102, fluidics connectors 104, pneumatics connectors 106 and small signal electrical connectors 108 of FIG. 3b). Again, the robotic infant is normally positioned "head-to-physician" and the 8 inch cable length provides enough mobility so that the robotic infant may be realistically moved upon the workstation surface.

A plurality of pressure sensors are employed within the robotic infant as part of a feedback system to evaluate an attending physician's resuscitation performance. FIG. 6 depicts RI 200 with 13 pressure sensors disposed within the android. Nine pressure sensors 222 are arranged in a grid in a chest plate system 220, while the underside of the robotic infant's hands and feet each contain a single pressure sensor 224 & 226, respectively. Each pressure sensor is of a resistance change type such that the sensor's resistance is directly proportional to pressure applied to the sensor. Each sensor is connected to the system's main processor via cables as illustrated, such as cable 227. These cables pass through the cable way 210 in the back of robotic infant 200.

Speaker placement for one embodiment of the robotic infant is depicted in FIG. 7. In this embodiment, three speakers are employed. A speaker 230 is positioned within the head of the robotic infant to emit vocal sounds, while speakers 232 are disposed within the chest to emit chest sounds, such as a heart beat and breathing sounds. By way of example, each speaker may comprise an 8 ohm, low power speaker. Cables, such as cable 234, connect speakers 230 & 232 (via the cable way) to a main processor audio synthesizer module (discussed below).

Figure 8:
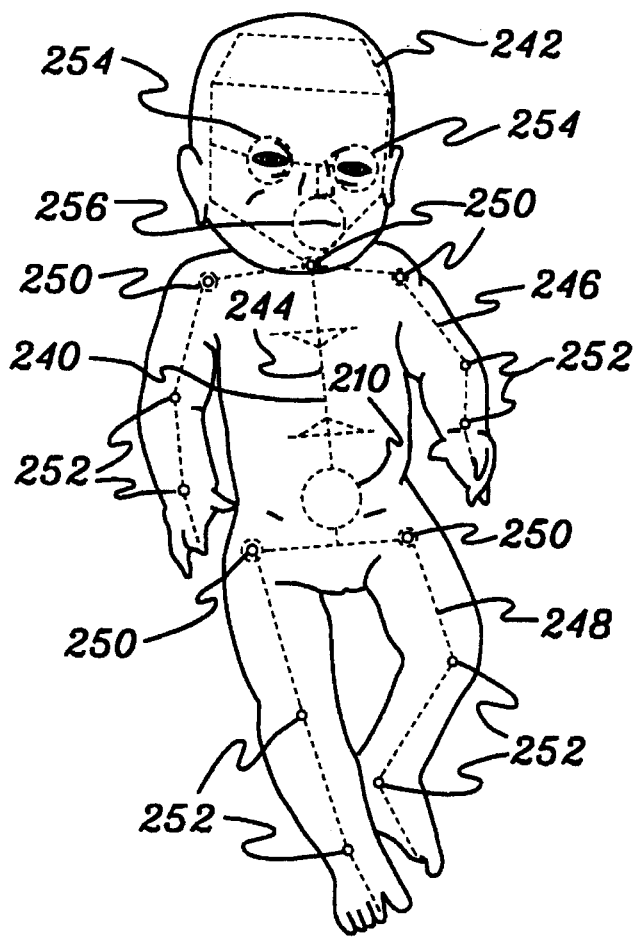
FIG. 8 is a plan view of a skeleton layout for the robotic infant of FIG. 5.

FIG. 8 depicts in phantom one embodiment of a robotic infant skeleton 240. Skeleton 240, which may be fabricated with nylon or plastic spars, includes a head frame assembly 242, a chest plate mounting assembly 244, cable way 210, arm assemblies 246 and leg assemblies 248. As discussed further herein, a plurality of rotary joints are employed within the robotic infant. These rotary joints include both dual axis rotary joints 250 and single axis hinge joints 252. As shown, skeleton 240 also contains eye mechanism mount frames 254 and a mouth mechanism mount frame 256.

Figure 9:
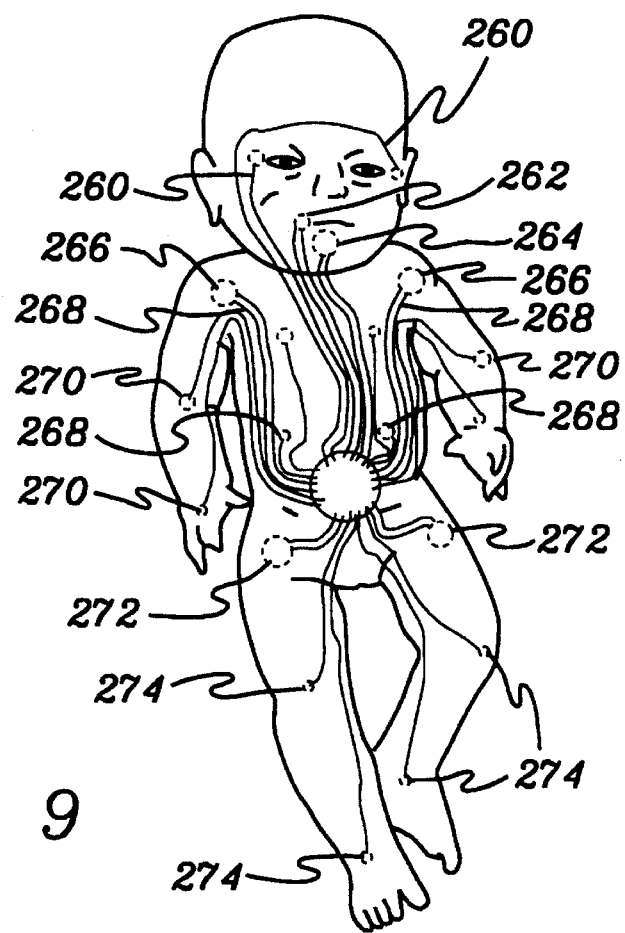
FIG. 9 is a plan view of one embodiment of motion cable layout for the robotic infant of FIG. 5.

Each joint of the skeletal mechanism, as well as the eye and mouth motion assemblies presented below, are computer system controlled (via cables) to provide accurate simulation of robotic infant movement. FIG. 9 illustrates one motion cable layout pursuant to the present invention. The cables are preferably constructed of teflon sleeves (similar to that of a catheter) where a center strand slides back and forth to operate one of various motion joints fixedly secured to a distal end. The mechanism is similar to that of a "automatic break cable" yet constructed of thin gauge teflon material. Cables 260 control eye opening/closing motion, cable 262 allows control of mouth opening/closing and tongue motion, cables 264 control the neck rotary joint, cables 266 control rotary shoulder joints, cables 268 control chest plate motion, cables 270 control arm motions, cables 272 control rotary hip joints, and cables 274 control leg motions. All motion cables exit robotic infant 200 via cable way 210, and are connected to a linear servo motion assembly system (described below) located within the base of the resuscitation workstation.

Figure 10:
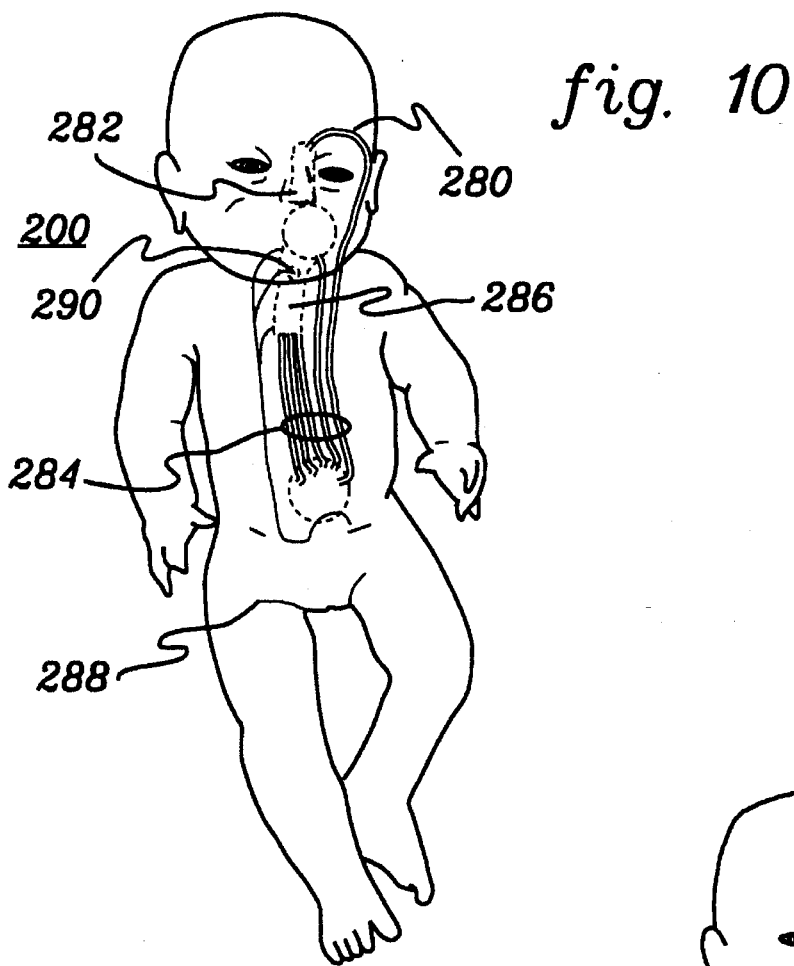
FIG. 10 is a plan view of one embodiment of fluid insertion/extraction tubes and throat-tube sensor connections for the robotic infant of FIG. 5.

Placement of fluid insertion/extraction tubes and throat-tube sensor connections within the robotic infant are depicted in FIG. 10. Excretion and purging of infant fluids are accomplished via plastic tubing as depicted (see also FIG. 22). Preferably, fluids simulate the nasal and throat fluid excretion of a newborn. The fluid is a non-sticky, non-staining teflon based emulsion which is pumped up to the robotic infant under control of the main workstation processor (not shown). Tube 280 provides nasal fluid excretion which emits from a nasal port 282 in RI 200. Tubes 284 purge (via suction) fluids from the throat tube mechanism 286, and insert fluid into the throat tube mechanism at both the top and bottom as illustrated. The tube which inserts fluids into the upper throat tube also inserts fluids into the mouth assembly. Single lines 282 are employed to connect proximity detectors 290 to the main computer system (FIGS. 14a–14d) for detecting throat tube instrument insertion by the main processor. These control lines exit RI 200 and fan out, for example, in a flat cable connect to provide multiple lines to the main processor sensing input ports (described below).

Figure 11:
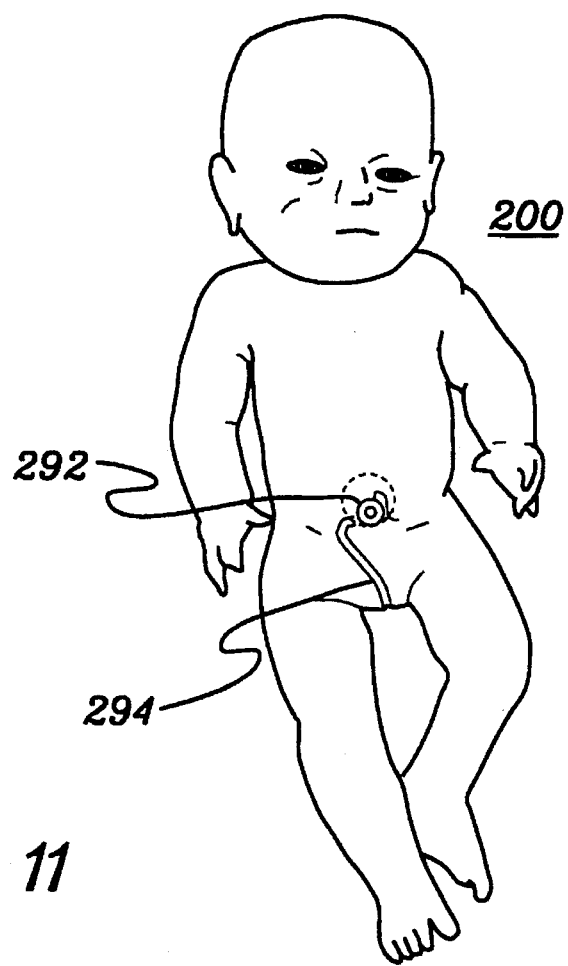
FIG. 11 is a plan view of one embodiment of naval/anal insertion/excretion fluid tubing for the robotic infant of FIG. 5.

FIG. 11 depicts a simulated umbilical "stub" 292 which houses a magnetic proximity detector (similar to those in the throat tube depicted in FIG. 22) to detect the insertion of medication administration tubes within the umbilical stub. Anal fluid excretion is pumped from the robotic infant via tube 294 and the simulation fluid excretes from the anal passage of the robotic infant. As discussed further below, this is a separate fluid from the fluids described in connection with FIG. 10.

Figure 12A:
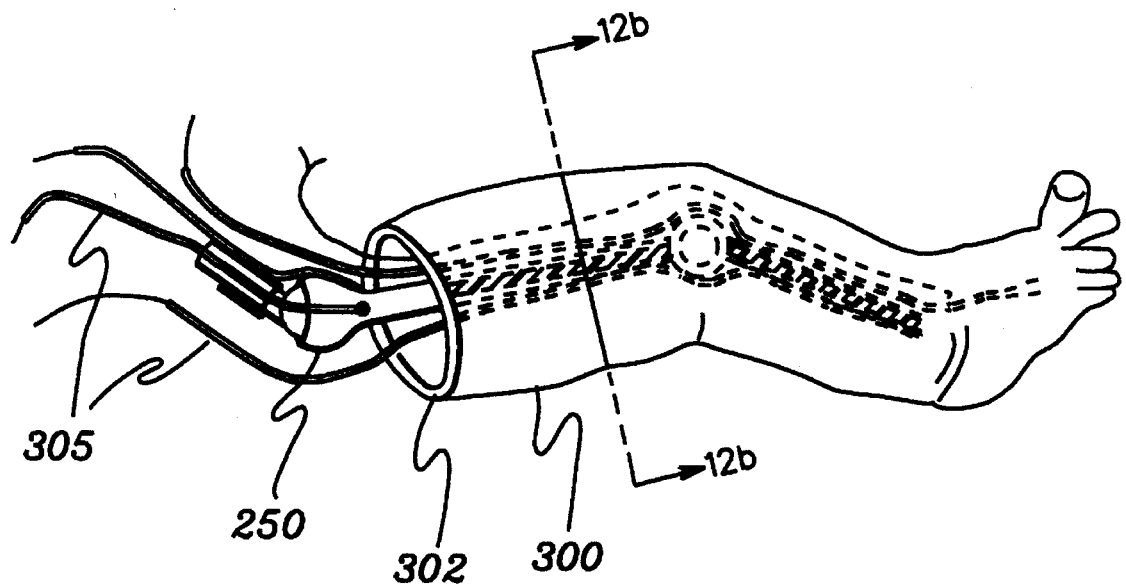
FIG. 12a is a cutaway view of an assembled leg structure for the robotic infant of FIG. 5.
Figure 12B:
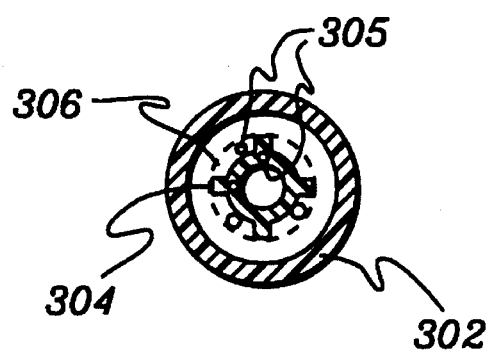
FIG. 12b is a cross-section of FIG. 12a taken along lines A—A.

A single leg limb is shown in FIGS. 12a & 12b to illustrate a preferred construction for the robotic infant. This leg limb 300 includes an outer skin surface 302 made from a latex compound of soft composition to accurately replicate the feel of a newborn infant's skin texture. The inner structure comprises a teflon spar 304 surrounded by a polyester fiber material 306, which together provide basic shape support of the outer skin material 302. Material 306 also provides the feel of a readily "pliable" surface as expected of an actual newborn. The spar extensions add additional support throughout the internal area. Numerous control cables 305 (as described above), extend throughout the robotic infant. FIG. 12a also depicts a dual axis, hip rotary joint 250.

Control Systems

Figure 13:
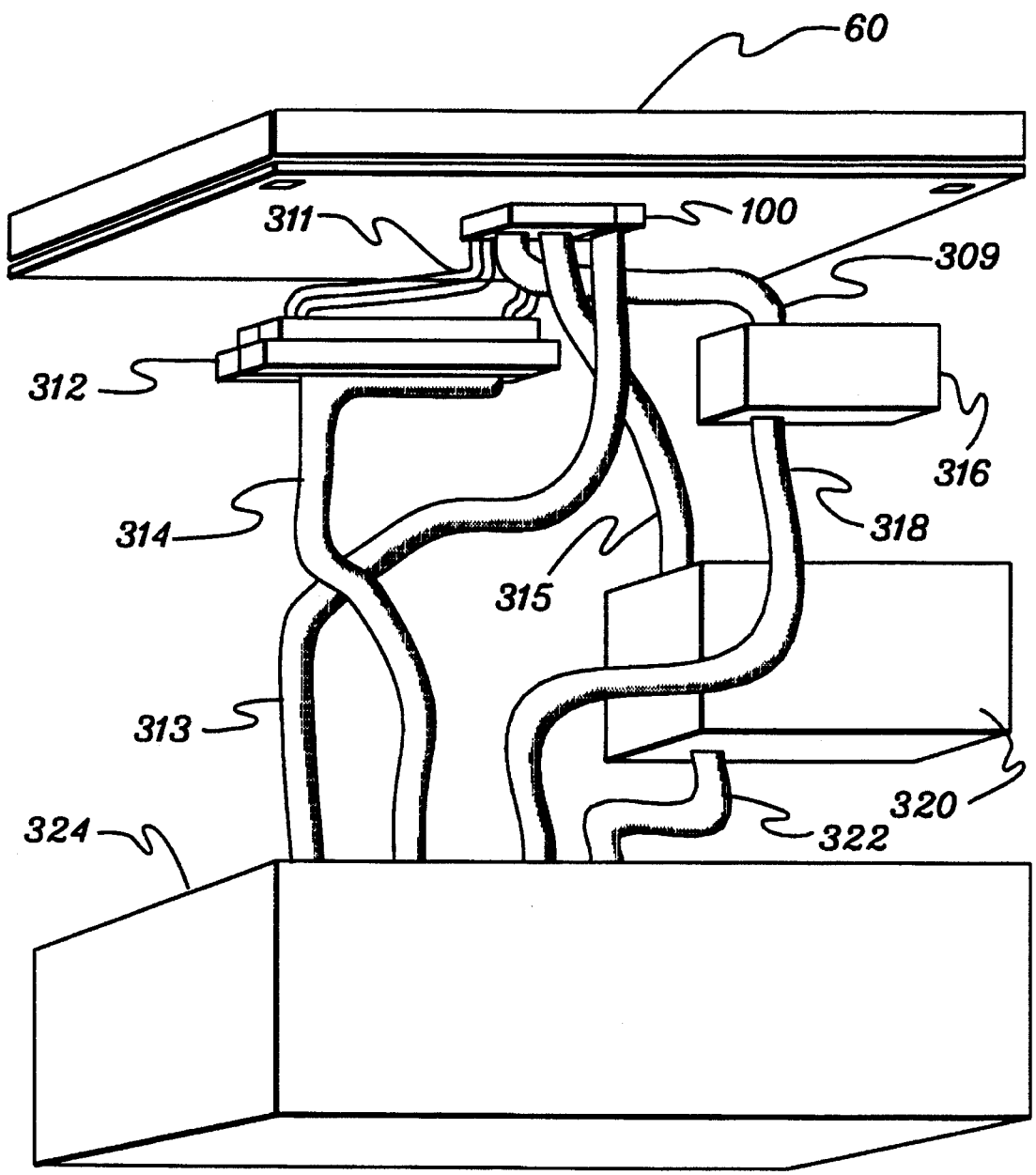
FIG. 13 is a block diagram of one embodiment of organization and interconnections for major system modules within a resuscitation workstation pursuant to the present invention.

The various control modules or "sub-systems" located within the base of the resuscitation workstation 12 (FIG. 1) are depicted in FIG. 13. Each module is mounted (or housed) within its own enclosure to facilitate unit assembly and maintenance. As shown in FIG. 13, robotic infant connectors (102, 104, 106, 108) are housed in well 100 within the workstation's infant support surface 60. Extending from well 100 are pneumatic tubes 309, motion cables 311, electric cable connects 313 and fluid hoses 315. A linear servo motion control system 312 provides physical actuation to motion cables 311. Motion control system 312 (FIGS. 15a–16) is electrically connected via servo system control cable 314 to a main computer 324 (FIGS. 14a–14d). Cabling 314 may comprise a ribbon type cable connection. A pneumatic system 316 (FIG. 18) receives pneumatic tubes 309 and is responsive to main computer 324 via pneumatic system control cable 318. A fluid management system 320 (FIG. 17) connects to fluid hoses 315 and is responsive to the main computer's 324 signals received over fluid management system control cable 322.

In one embodiment, multi-conductor ribbon cable is used to connect all control modules to the computer system with appropriate connectors at each end. An additional cable (not shown) from the computer system to the external devices of the workstation (keypad, keyboard, UV lighting, help screen, report printer, resuscitation instruments) emanates from the rear of computer 324 and connects to the rear wall of the workstation. System modules 312, 316, 320, 324 and their interconnections are described below in greater detail with reference to FIGS. 14a–18.

FIGS. 14a–14d depicts one embodiment of a central processing system 324 pursuant to the present invention. This processing system controls and operates the resuscitation workstation, robotic infant, and virtual reality environment system. Processing system 324, located, for example, in the base of the resuscitation workstation, is a PC compatible system having a state-of-the-art central processor 330 such as a "486" microprocessing chip with 8 Mb of RAM. A PC compatible system is selected because of its compatibility with a wide array of special peripheral devices, such as user keypad 62, keyboard 64 and monitor 52. Additionally, the basic structure of the system permits the use of software modules and software development tools within wide use throughout the robotics and medical automation/instrumentation industry.

Processor 330 is provided with a 150 or 300 megabyte hard drive 332, a tape backup 334, a dual floppy disk 336 and a report printer 338. In addition to such standard PC components, an A to D/D to A robotics control module 340 and an audio synthesizer module 342 are employed. Module 340 allows processor 330 to interact with and control the functionings of the robotic infant and the associated workstation. In one embodiment, there are 160 discrete input and output control lines to operate the system. The various inputs and outputs may be functionally grouped as indicated in FIGS. 14a–14d. The audio synthesizer module is programmable and used to generate infant sounds produced within the robotic infant's head speaker and chest transducers, discussed above.

Figure 14B:
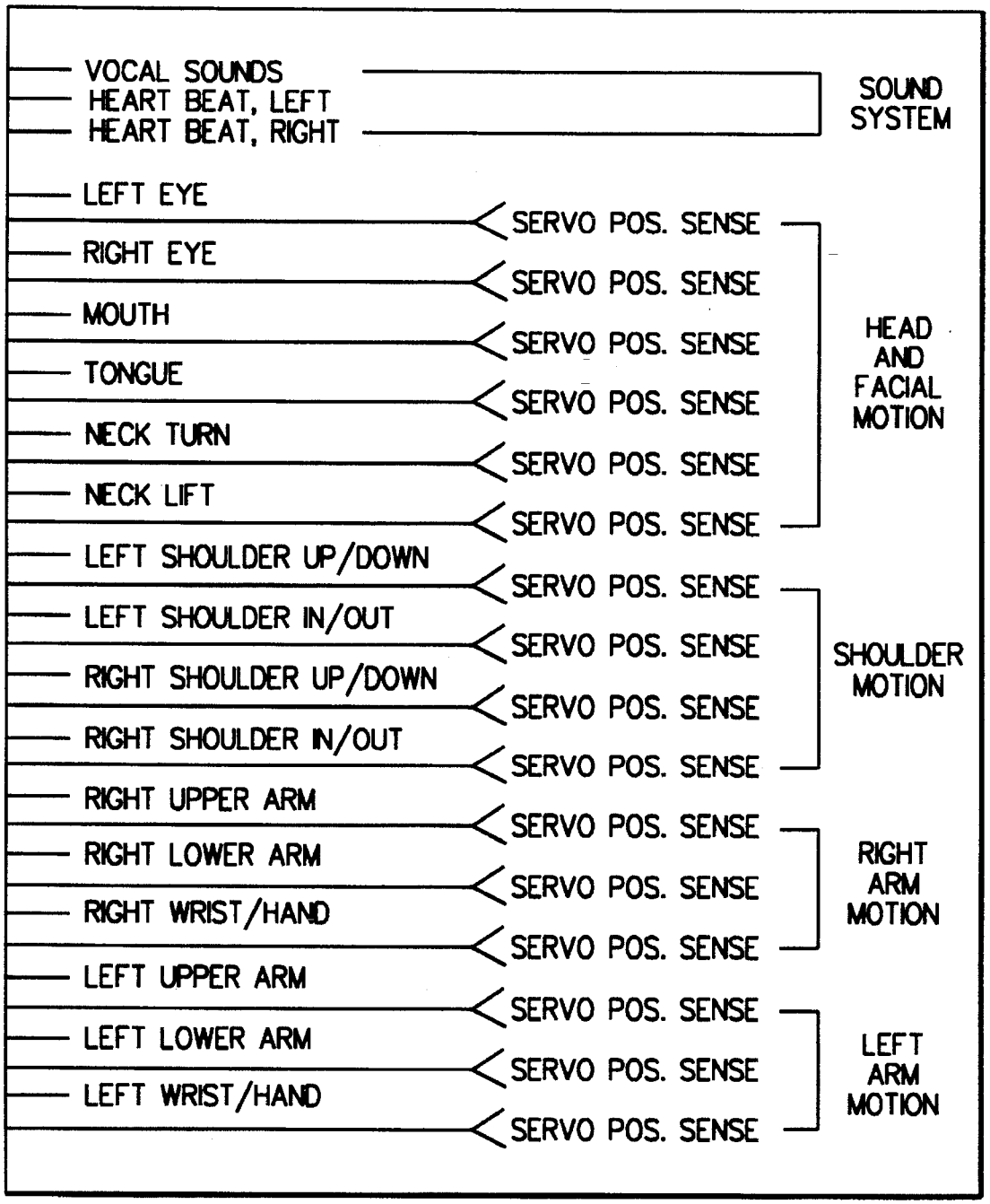
Figure 14C:
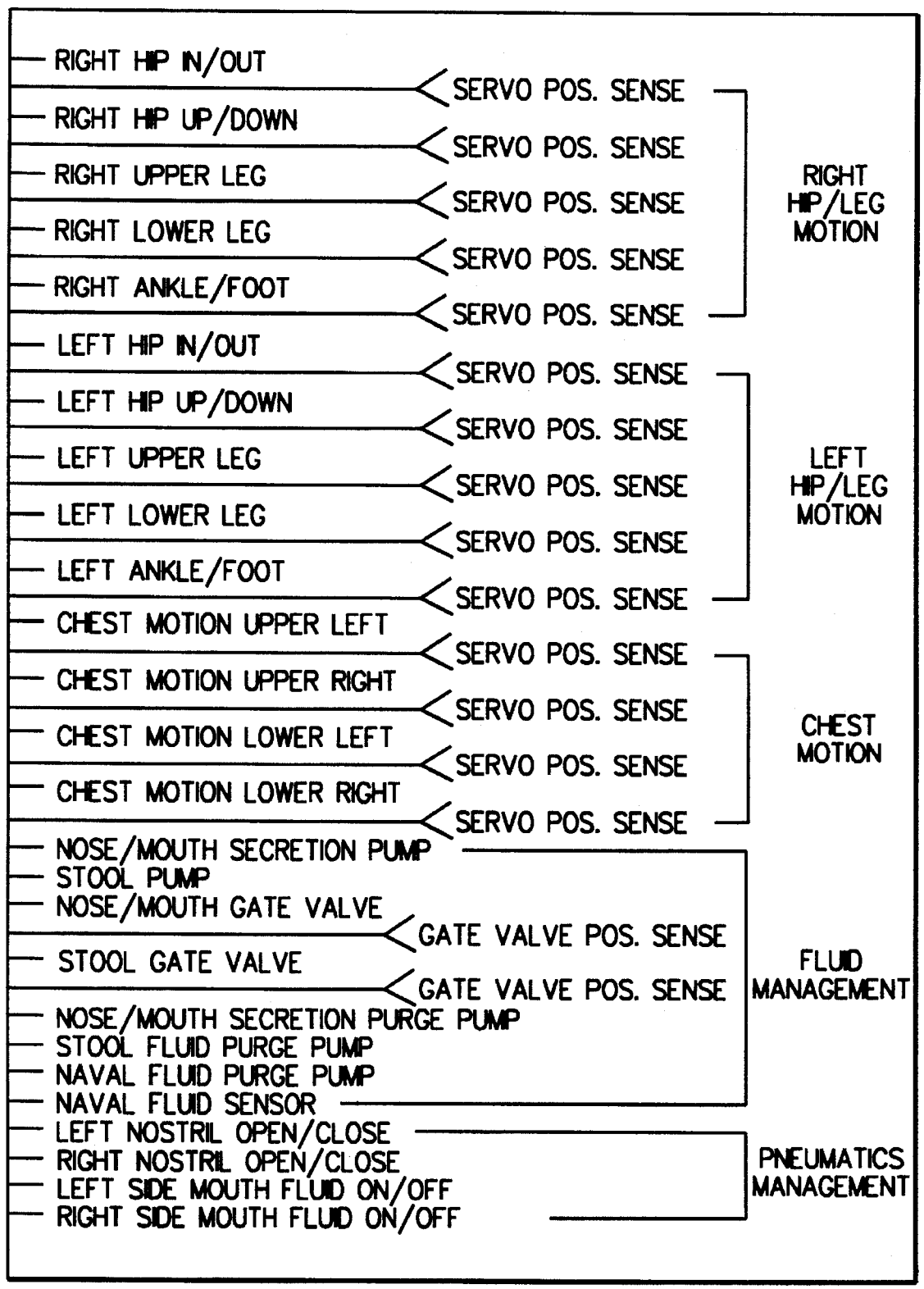
Figure 14D:
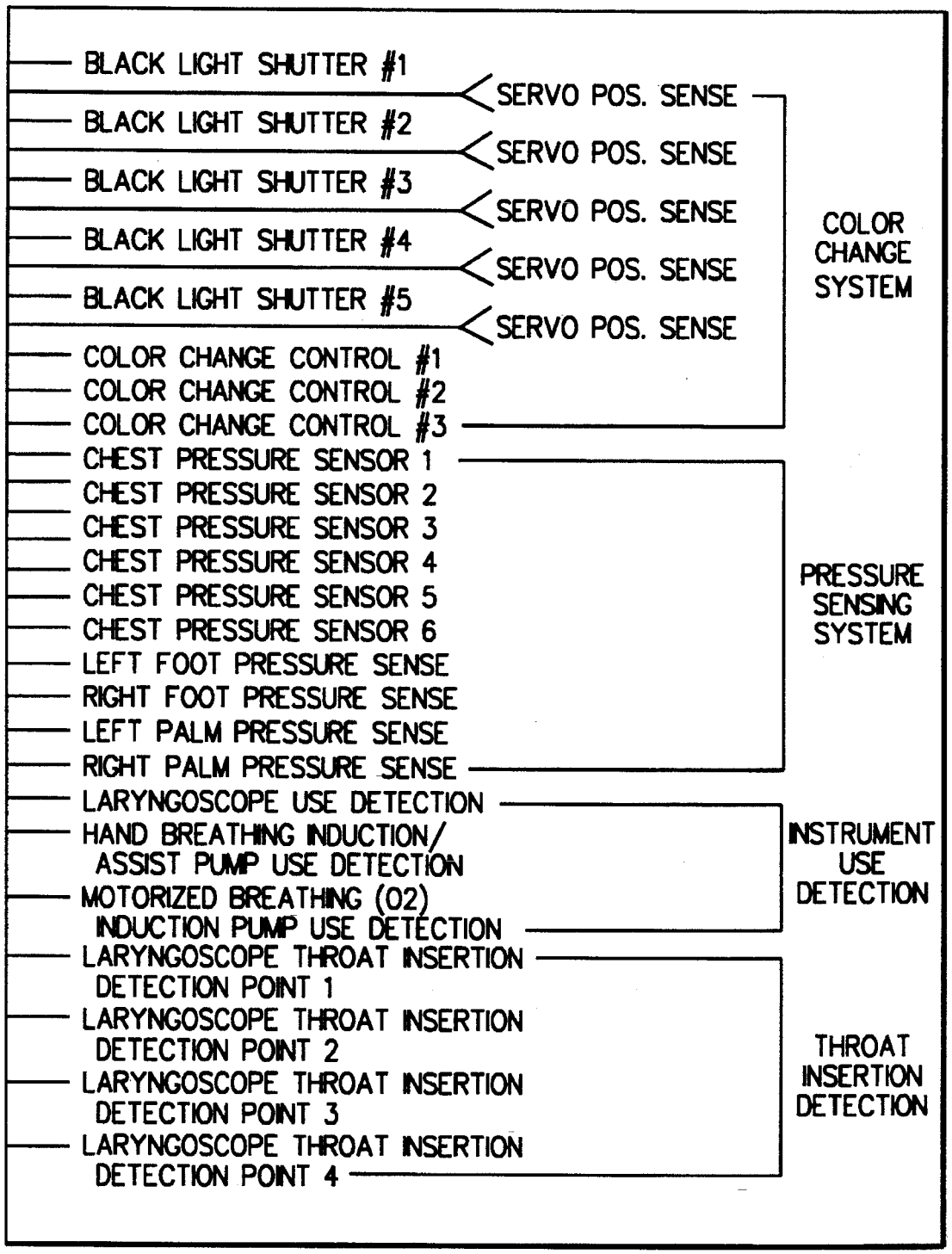

One embodiment of a linear servo mechanism for generating robotic infant motion is depicted in FIGS. 15a, 14b & 15c. As noted with respect to FIG. 13, linear servo motion system 312 is preferably located within the base of the workstation. In the depicted embodiment, 30 linear servo motors 350 are employed, each of which is under control of the main processing system 324. These motors are supported by a mount plate 352, and each includes a linear plunger 354 with the speed, distance and direction of motion being under processor control. Each linear motion plunger 354 is connected to a unique motion cable 311 which couples to a particular joint within the robotic infant. Motion cable 311 is supported by a top plate assembly 358.

Each servo is a small reversible dc motor driving an internal worm mechanism which translates rotary to linear motion. The servos are operated by plus and minus 12 volts dc. Additionally, RI detectors enable the servo control mechanism (i.e., the central processor) to be aware of the general position of each servo's linear plunger. This permits the inclusion of a "servo-home" command to reset the system when required. The travel of each mechanism is approximately 1 inch, with a slew rate in excess of 1 inch per second. This is more than adequate to replicate the maximum speed of infant motion required to effect "life-like" motion. (The one inch per second is only a fraction of the actual limb speed achieved by the robotic infant since the linear motion is being re-translated into angular motion at each RI motion joint.)

As noted, the motion cable connectors provide a positive motion connection between the robotic infant and the linear servo system which is under computer control. There are thirty independent connections within the device which transmit all linear cable motion to the robotic infant. Connection is achieved by a "spear and socket" arrangement for the center strand of the motion cable. The connector is keyed and locked in place by two threaded locking posts accessible from the conductor well 100 (FIG. 13) located in the center of the workstation's work surface.

Figure 16:
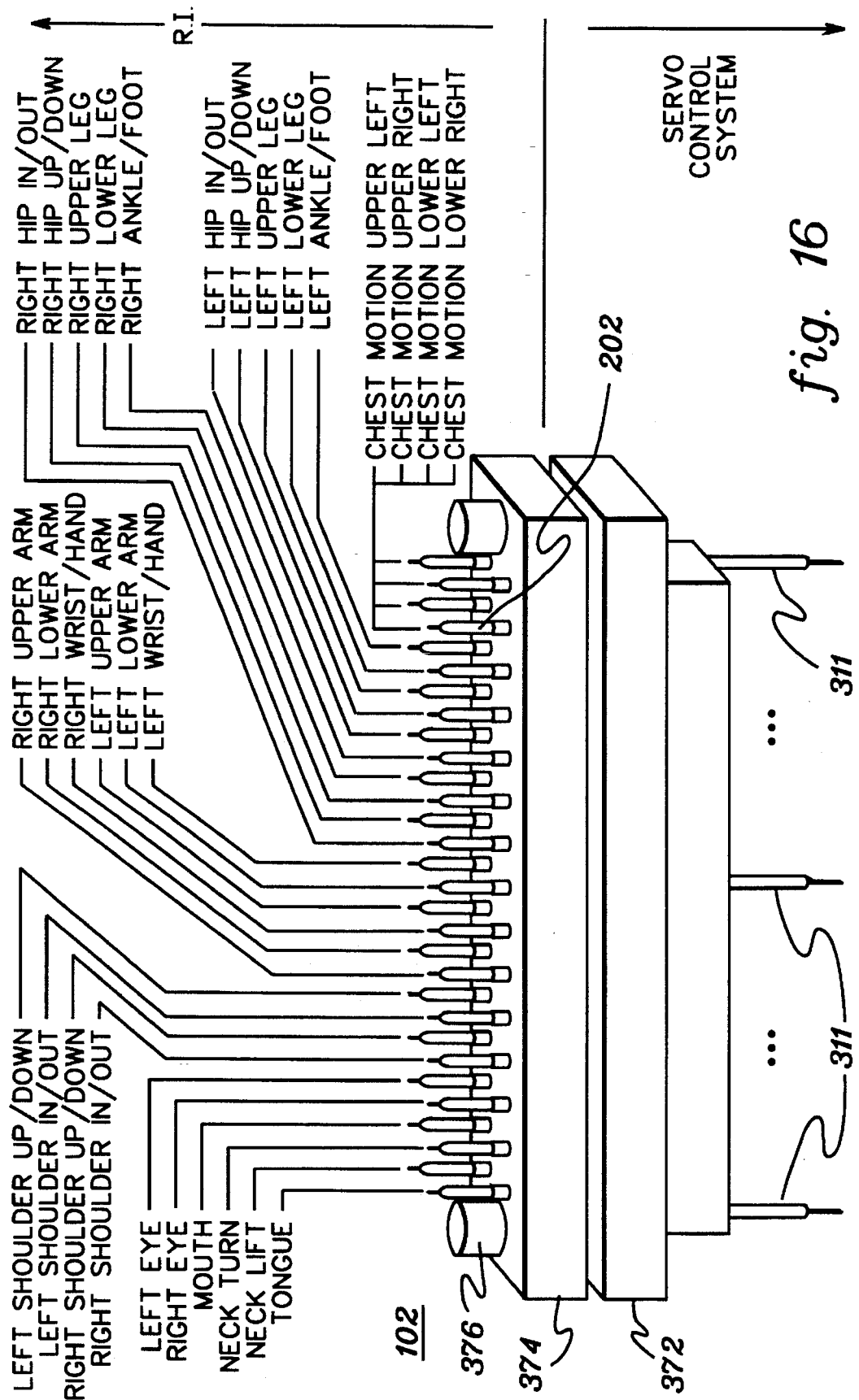
FIG. 16 depicts one embodiment of a motion cable connector configuration pursuant to the present invention.

One embodiment of the motion cable connectors 102, along with a cable destination layout, is depicted in FIG. 16. Motion cable connector 102 is connected to the linear servo motion system 312 via 30 motion cables 311. Motion cable connectors 102, disposed within the RI support surface well 100, include a female block 372 and a male block 374 which are maintained in position via threaded lock posts 376. As noted above, teflon motion cables 202 connect to the various joints within the robotic infant.

Figure 17:
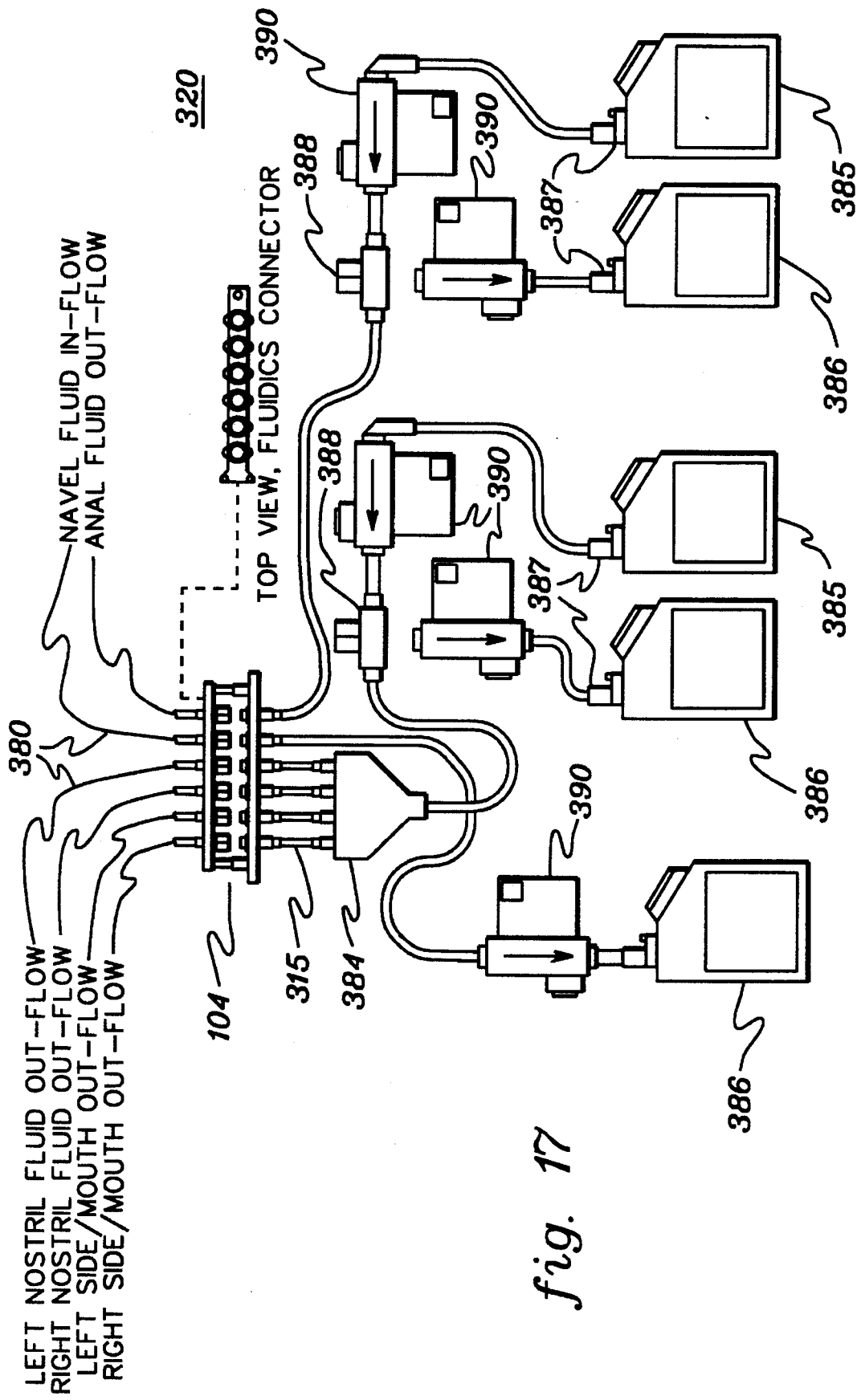
FIG. 17 depicts one embodiment of a fluid management system pursuant to the present invention.

One embodiment of a fluid management system 320 is depicted in FIG. 17. This sub-system provides the fluid source and controlled fluid transmission to the robotic infant for subsequent secretion during a given resuscitation simulation. Again, two distinct fluids are utilized; one for the nasal, mouth and throat tube system and a second for the robotic infant's anal passage. A fluid purge function is also included to suction out any remaining fluids within the system upon the completion of a given simulation process. The fluid pumps and associated gate valves are under the control of the simulator's central computer 324 (FIG. 13).

The two different types of simulation fluids are housed in separate plastic containers 385, which preferably include quick connect/disconnect rubber stoppers 387 to permit rapid exchange of containers when fluid replacement is required. Fluid resident within purged fluid containers 386 may be reused as often as desired by being transferred into the respective simulation fluid containers 385. The fluidics connector 104 is located within the connector well 100 (FIGS. 3b & 13) in the robotic infant support surface of the workstation. As noted with respect to FIG. 13, the flow management system is preferably located within the base of the workstation near central computer system 324. Five unidirectional pumps 390 are employed with pressure directions as indicated in FIG. 17. Two dual ported gate valves 388 are needed to control "pumping out" and "purging back" fluid functions. A four way fluid splitter 384 connects to four of the fluidics connectors 104. Hoses 380 of connector 204 then provide transfer of the fluid within the robotic infant.

Figure 18:
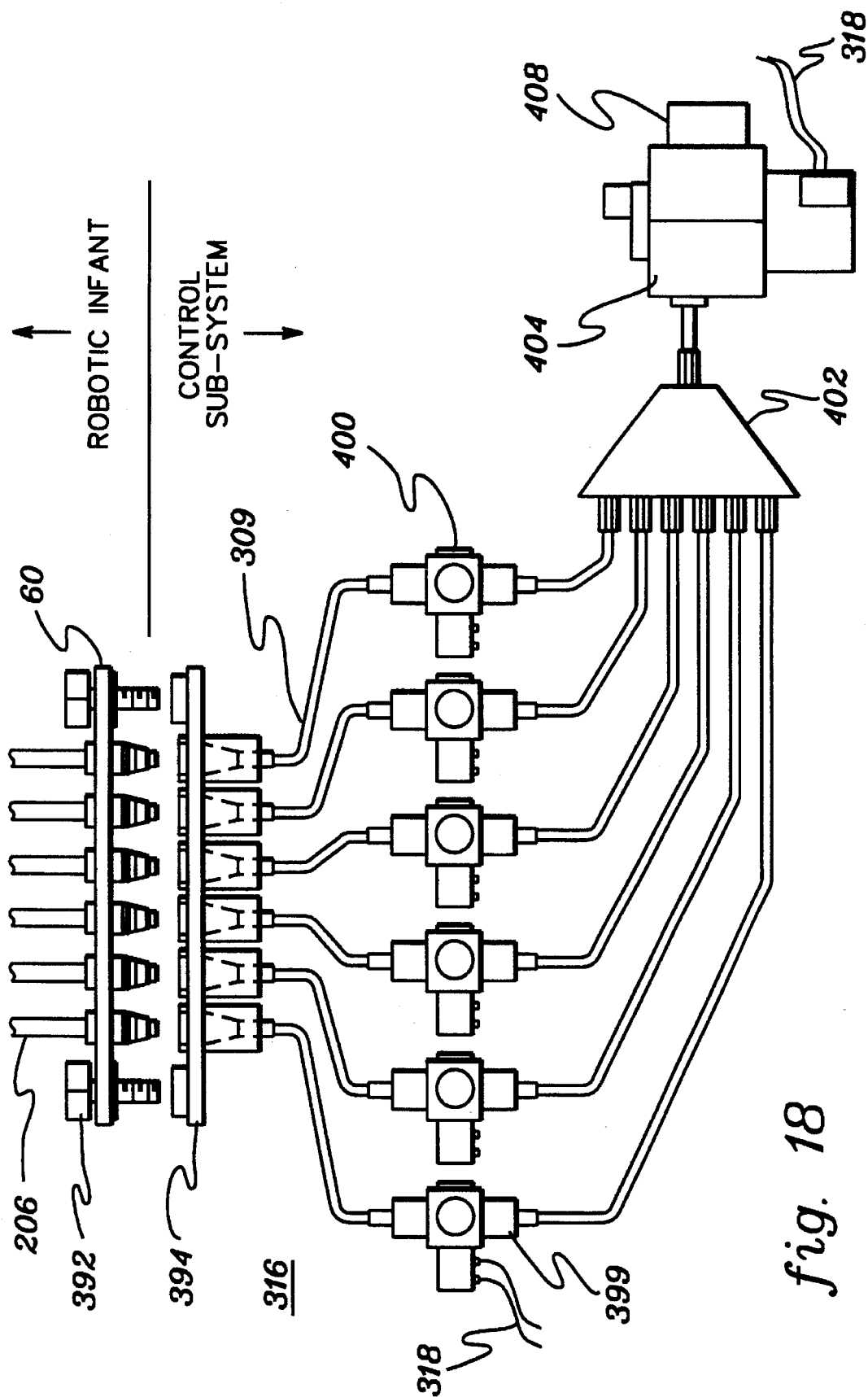
FIG. 18 depicts one embodiment of a pneumatic management system pursuant to the present invention.

One embodiment of a pneumatics management system 316 is depicted in FIG. 18. The connectors 106 (FIG. 3b) for the pneumatic management system is located within the connector well 100 (FIG. 13) of the robotic infant support surface 60 and the pneumatic control sub-system is located within the base of the workstation. This system controls the opening and closing of small pneumatic gate valves (discussed above) located within the robotic infant for the purposes of controlling fluid excretion from the robotic infant. The system is configured so that the electrically operated gate valves are remotely located from the robotic infant to reduce the number of electrical control lines required to connect the android. Additionally, this allows the noise generated by operation of the electrical gate valves to be isolated from the robotic infant thereby reducing the probability of unwanted noise queues emanating from the robotic infant during resuscitation simulation. Each control valve is operated by the simulator's computer system 324 (FIG. 13), as are bleed valves which are used to reset the system's air pressure to one ATM following the completion of a simulation. The pump unit utilizes a self contained adjustable pressure regulator and the volume of space within the six way splitter acts as a reservoir for compressed air storage.

In the embodiment depicted in FIG. 18, air tubes of connectors 206 are connected to the well of the robotic infant support surface 60 which, via connector locking screws 392, connects to a female portion of the pneumatic connector 394. Connector portion 394 holds six air tubes 309 each of which is connected to a separate solenoid valve 399. Valves 399 are controlled by the central computer 324 (FIG. 13) via solenoid valve control lines 318. Each valve 399 includes a bleed valve 400. A six way tube splitter 402 connects with each solenoid valve 399 and is fed air by air pump 404. Pump 404 itself is controlled via lines 318 and includes an air filter and pressure regulator 408.

Internal RI Structures

Further structural details of the preferred embodiment of a robotic infant are presented below with reference to FIGS. 19–25.

FIG. 19 depicts one embodiment of a robotic infant skeleton 500 pursuant to the present invention. Skeleton 500 includes 15 separate spars or spar assemblies including: head frame, shoulder, upper left arm, lower left arm, left hand, upper right arm, lower right arm, right hand, chest/spine/hip assembly, upper left leg, lower left leg, left foot, upper right leg, lower right leg, and right foot. The limb spars are made from stock size teflon, while the head and the chest/spine/hip units are fabricated from a nylon material. Head frame 502 includes eye mechanism mounts 504 and mouth mechanism mounts 506. Ball joints 508 interconnect the various spar assemblies as shown. In addition, hinge joints 510 are provided in the arms and legs. The chest/spine/hip assembly includes chest plate mount arms 512 and motion cable mount blocks 514. Cable way 210 is the support and tie point area for all motion, fluidic, pneumatic and electrical lines entering the robotic infant, and pressure transducers 511 (discussed above) are also shown at the hands and feet.

As briefly mentioned above, two types of motion joints are used within the robotic infant. First, a dual axis control ball joint 508 (FIG. 19a) is employed at the neck, shoulders and hip points of the robotic infant skeleton shown in FIG. 19. Second, a single axis control hinge joint 510 (FIG. 19b) is used at the elbows, wrists, knees and ankles of the skeleton. All joints are made of teflon and controlled via teflon pull cables 520. These cables (via their central control strand 522) are activated by their respective linear servo actuators of the motion control sub-system within the base of the workstation. A total of 17 joints are utilized for the robotic infant of FIG. 19, which requires a total of 22 separate motion control cables 520. (Each dual axis motion joint 508 requires two control cables for control of the associated ball joint 524.) Each cable is held in position by a cable brace 526 which partially surrounds one of the spars 528. In the single axis motion joint 510 of FIG. 19b, teflon controls 530 are employed to position the control cables relative to a rotary joint 531 and its nylon spars 532.

Figure 20:
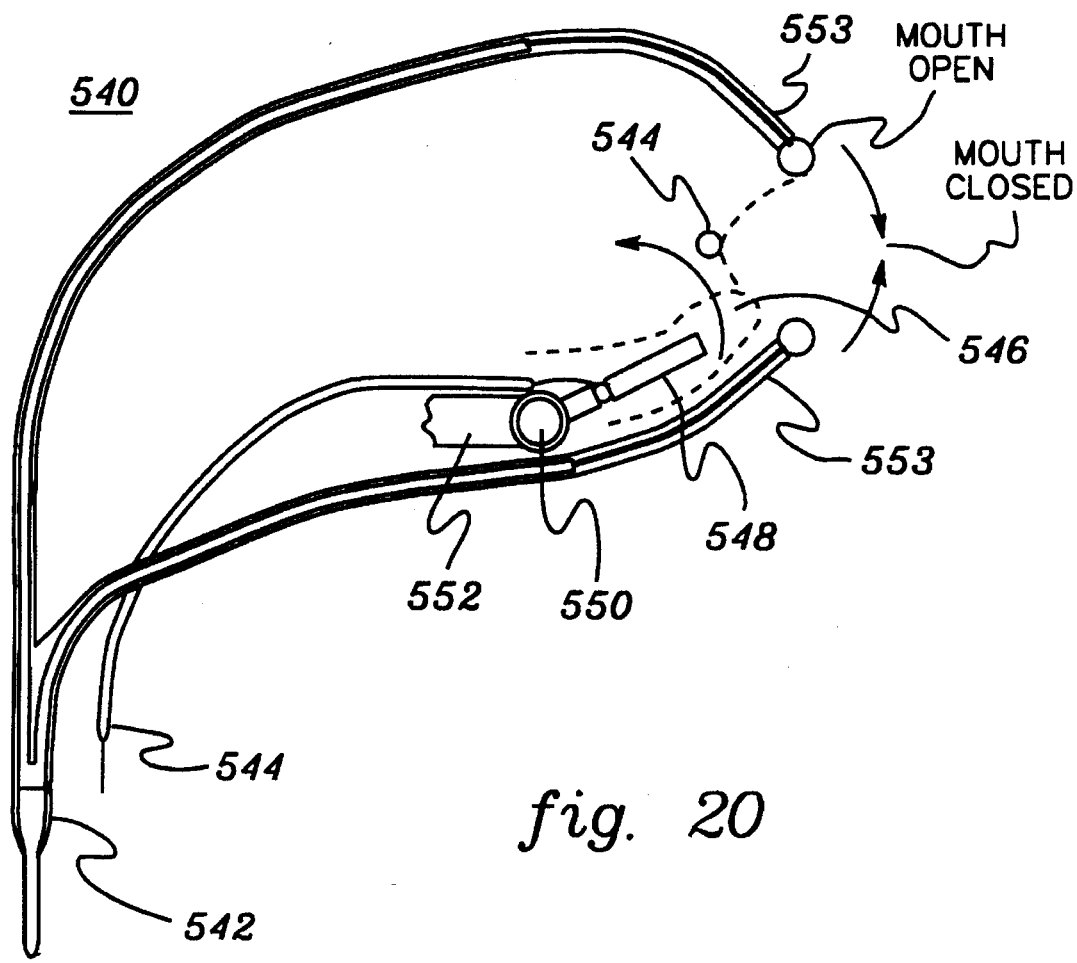
FIG. 20 is a side elevational view of a mouth motion system for a robotic infant pursuant to the present invention.

As shown in FIG. 20, two control cables operate the mouth and tongue motion mechanism 540. In particular, a forked motion cable 542 controls opening, closing and partial opening/closing of the mouth, while a tongue motion cable 544 controls the up/down motion of an RI tongue 546. The illustrated control configuration leaves the inside of the robotic infant's mouth clear to enable the insertion of instruments during a resuscitation simulation session and the appearance of fluids as required (see also FIG. 24). Tongue 546, fabricated, for example, of a latex material, is formed about a base structure 548 to which tongue motion control cable 544 is affixed as shown. Structure 548 pivots about a tongue motion pivot 550, which is fixedly secured to a facial frame member 552.

Figures 20A, 20B, 20C:
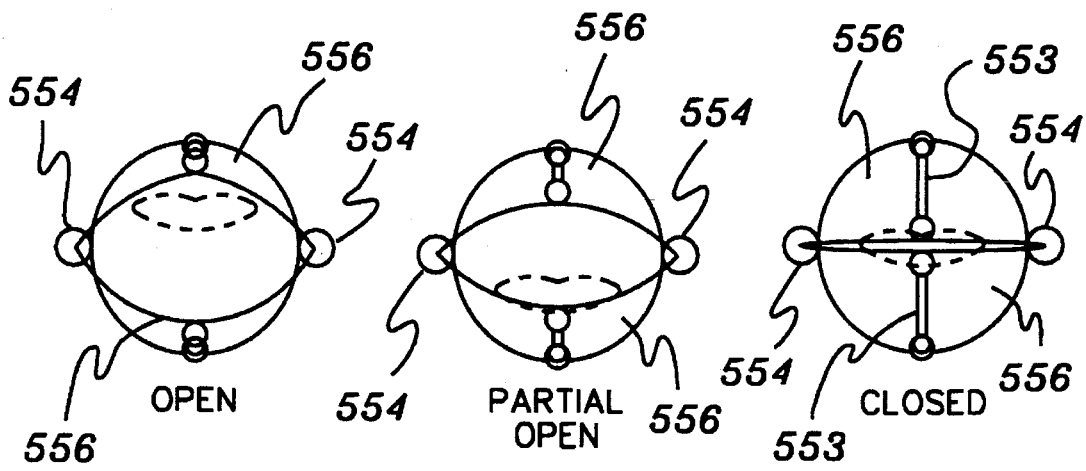
FIGS. 20a–20c depict front elevational views of the mouth motion system of FIG. 20, wherein the mouth is shown in open, partially open and closed positions, respectively.

Control of the robotic infant's mouth position is about a center motion pivot 554. Rigid and curved center control cables 553 are connected to latex membrane lips 556. By way of example, FIG. 20a depicts the robotic infant's mouth in an open position with tongue 546 raised, FIG. 20b depicts the mouth in a partially open position, with the tongue lowered, and FIG. 20c depicts the mouth in a closed position with the tongue centered. Because two control cables are used, tongue and mouth positions and functions can be controlled independently.

The eye motion system is depicted in FIGS. 21–21c. Each eye, constructed as illustrated in FIG. 21, includes an eyeball 560 made, for example, of a plastic bearing material having two motion pivots 562 located on each side. If desired, the pupil may be a dark brown dot or disk 561 affixed to the front of each eyeball 560. A single motion cable can be employed to operate the eyelids to effect opening, closing and partial opening/closing in a manner similar to the mouth motion system of FIG. 20. Preferably, each eye is under separate control to permit the simulation of "uneven" eyelid motion. Forked motion cable 564 includes a common control cable 566 disposed within an outer sheath 568. The control cables split as shown to connect at an upper end to a rigid and curved center cable portion 570 and at a lower end to a rigid and curved center cable portion 572. By way of example, FIG. 21a depicts an eye in an open position, while FIGS. 21b & 21c depict partially open and closed positions, respectively.

Figure 22:
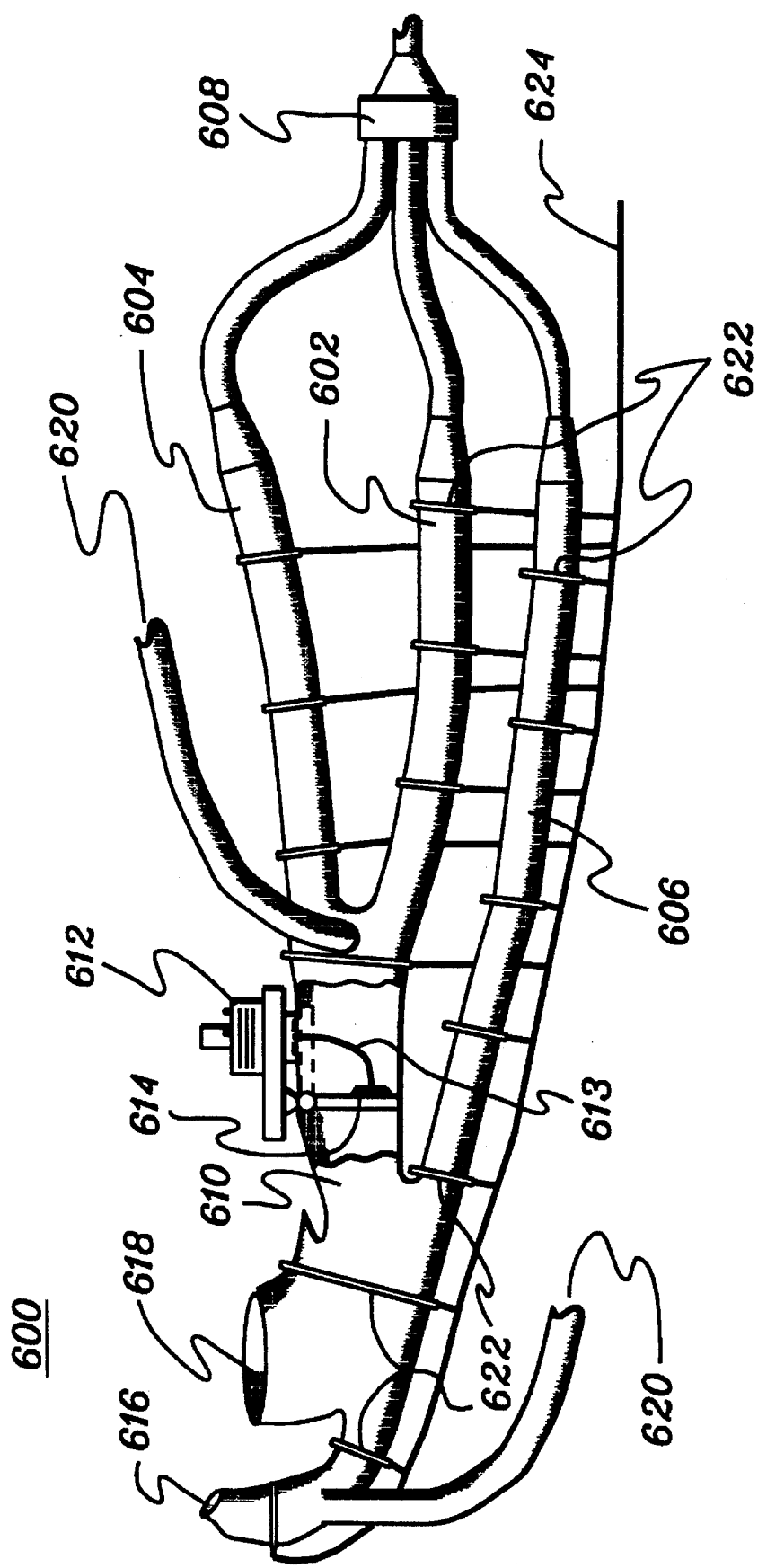
FIG. 22 is an elevational view of one embodiment of a throat-tube system for a robotic infant pursuant to the present invention.

Referring to FIG. 22, one embodiment of a throat tube system 600 pursuant to the present invention is shown. Throat tube system 600 performs the following functions: (1) provides an anatomical simulation of an actual throat tube for laryngoscope viewing; (2) senses the insertion of instruments within the mechanism via "magnetic proximity rings"; (3) simulates the opening and closing of vocal cords; (4) produces fluids within the nasal, mouth, esophagus and breathing passages (trachea/l-r main bronchus); and (5) allows purging of inserted fluids.

Throat tube 600 is fabricated via injection molding utilizing an appropriate latex compound. The tube is formed of two major sections, an upper section from the trachea/esophagus junction to the nasal/mouth passages and a lower section from the trachea/esophagus junction to the ends of the bronchus. The lower section includes a left main bronchus 602, a right main bronchus 604 and an esophagus 606. Each of these tubes terminates at a fluid purge tube 608. Left main bronchus 602 and right main bronchus 604 meet at the trachea 610 wherein a vocal cords control mechanism 612 is disposed. Control mechanism 612 operates a vocal cords restriction flap 614, which can reciprocate between a closed and an open position as shown.

This unit simulates an infant's closed vocal cords and prevents instrument insertion past that point. The device consists of a small linear actuator 612 which is electrically operated. When energized, the actuator (measuring 0.75 inches in width and height) closes the flap 614 via a flexible nylon curved arm 613. When de-energized, the flap swings open resulting from a return spring force within the linear actuator mechanism itself. The actuator is controlled via 12 volts dc and is interfaced to the simulator's main computer control.

The overall length of the assembled molded sub-system may be approximately 6 inches long for a full term infant simulation. When the system is assembled it is fluid tight with the exception of the nasal 616 and mouth ports 618. Entering the molded throat tube are two flexible plastic tubes 620 which allow for fluid insertion under control of the fluidic system, discussed above.

In the embodiment depicted, 16 inductors or "magnetic ring sensors" 622 encircle various sections of the throat tube to detect the presence of an inserted instrument. This is accomplished by affixing small steel tips to the instruments so that when an instrument is passed within a given sensor coil a flux density change is produced which is detected by the electronics interface module, via lines 624, and subsequently signalled to the simulator's computer control.

Figure 23A:
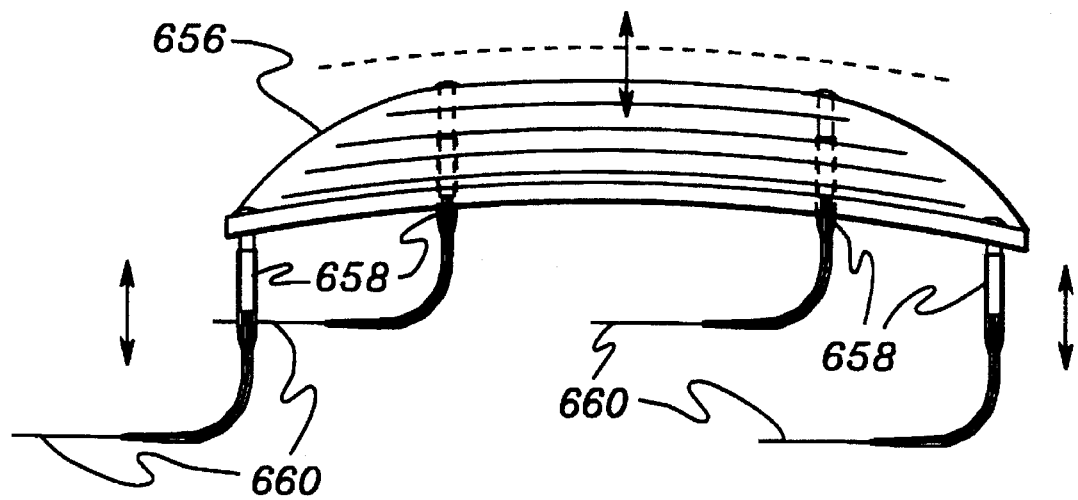
FIG. 23a is a side elevational view of one embodiment of a chest plate system for a robotic infant pursuant to the present invention.
Figure 23B:
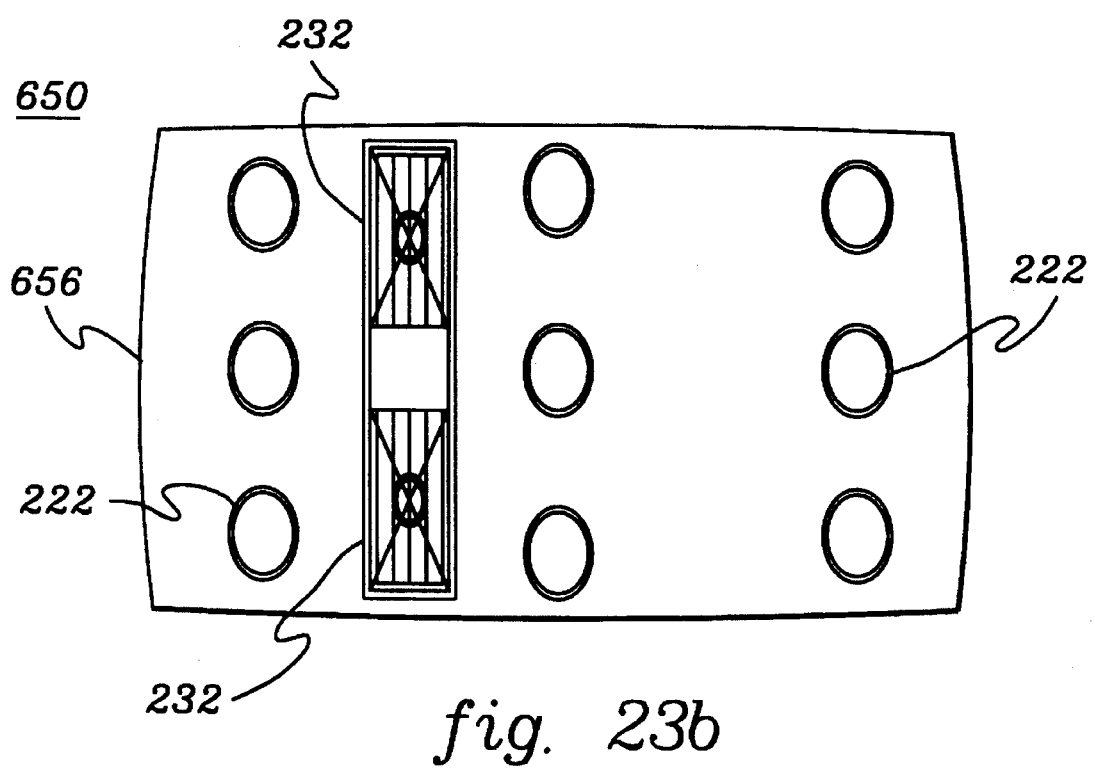
FIG. 23b is a top plan view of the chest plate system embodiment of FIG. 23a showing one positioning embodiment of external pressure sensing transducers within the chest system.

One embodiment of a chest sub-system 650, is depicted in FIGS. 23*a* & 23*b*. This system incorporates two sound speakers 232 (for heartbeat and respiration noise) and nine external pressure transducers 222. Note that although two audio sound transducers are preferred, the system may incorporate only one device if desired and still maintain adequate simulation effect of infant chest sounds. A chest plate 656 is driven by four motion pistons 658, each of which is activated by an independent motion control cable 660 ultimately controlled by the central computer.

The illustrated pressure transducers 222 are analog devices which change resistance depending upon the amount of external pressure applied to them. These devices register the location and amount of external pressure applied to the robotic infant's chest area by the person using the simulator. This enables the simulator's computer system to recognize when, where, and how much chest pressure is being applied during a resuscitation training session.

Four independent motion pistons 658 are preferably used so that an uneven or undulating chest motion pattern can be created. This agrees with the type of actual chest motion occurring within a live infant during resuscitation. The chest motion plate 656 is affixed to the robotic infant's skeleton frame (FIG. 19).

Figure 24:
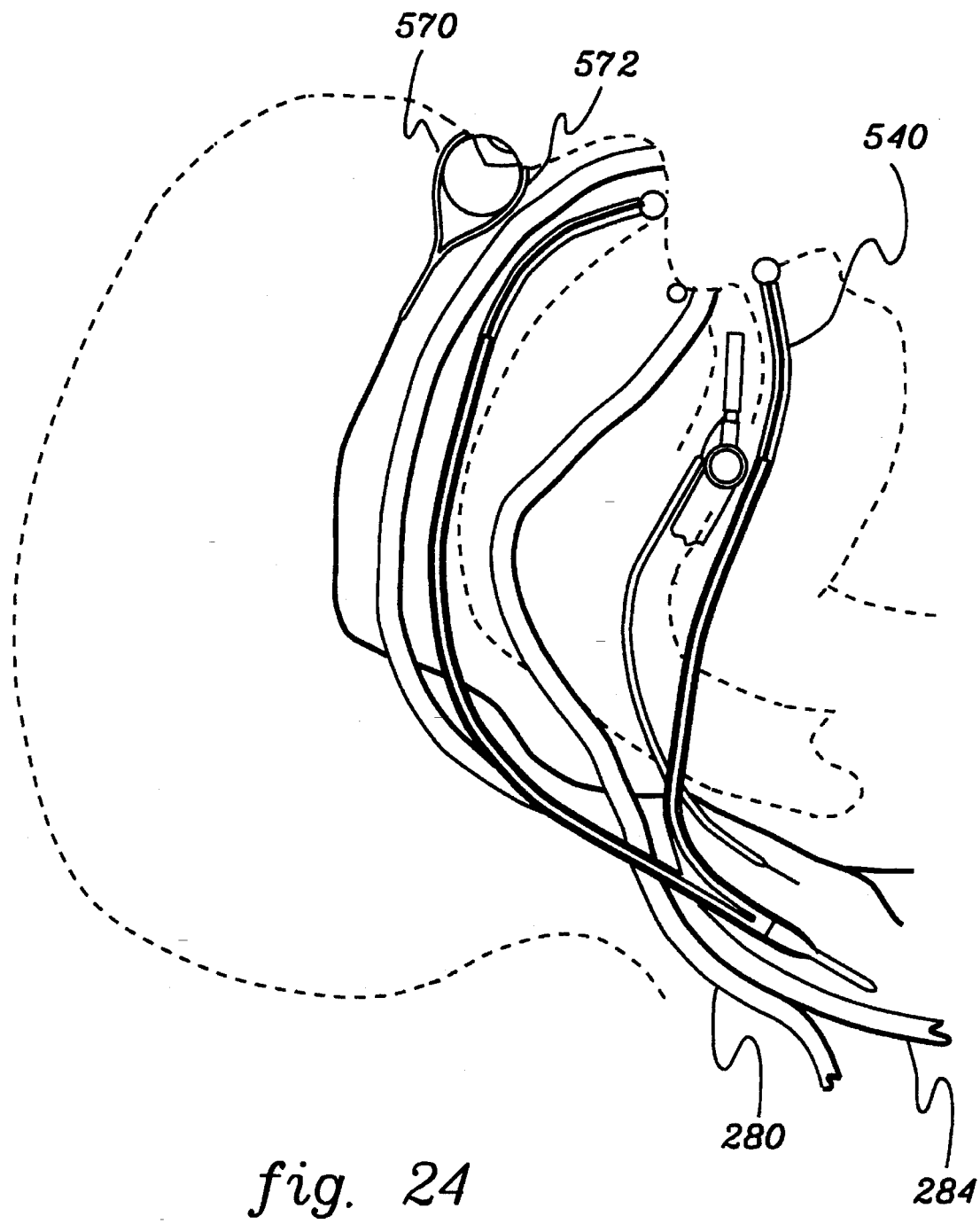
FIG. 24 is a side elevational view of one assembled embodiment of the head motion control and fluid flow assemblies for a robotic infant pursuant to the present invention.

FIG. 24 depicts the head portions of the RI motion and fluid sub-systems in assembled position. In this composite illustration the throat tube sub-system is also partially depicted. Preferably, the nasal fluid tube is split just above the nasal passage to effect fluid excretion from both nostrils. The mouth fluid tube is a single tube located at the roof of the mouth port to effect fluid insertion into the mouth.

Figure 25:
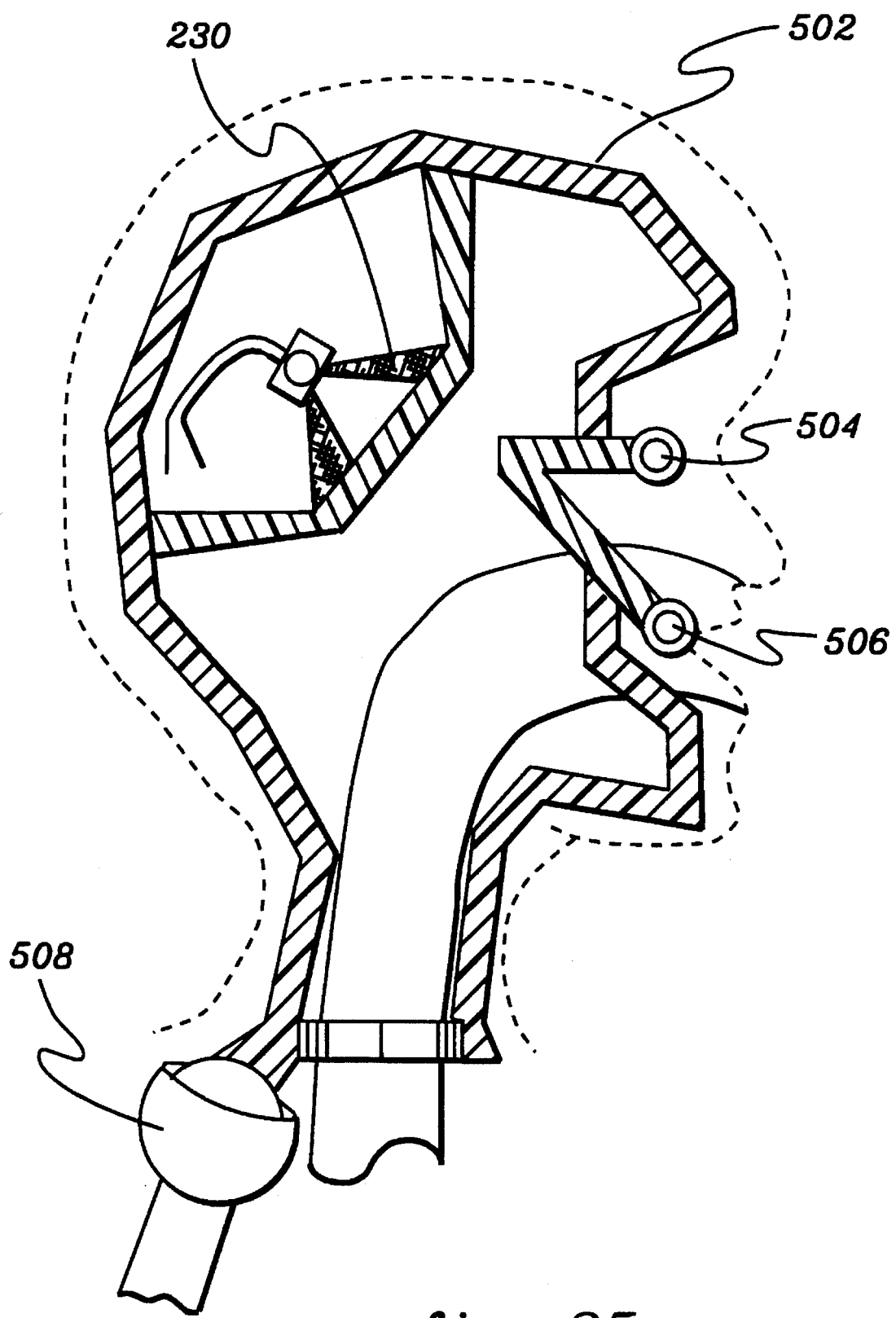
FIG. 25 is a side elevational view of one embodiment of a head frame structure for a robotic infant pursuant to the present invention.

Referring to FIG. 25, skeletal head frame 502 is depicted positioned within the robotic infant's head, shown in phantom. Head frame 502 is the support mechanism for all motion, fluid and sound generation (speaker) devices located within the robotic infant's head. As noted above, the frame is preferably fabricated from teflon spars and connected to the ball joint motion joint 508 at the base of the RI's neck. The eye mechanism mount point 504 and mouth mechanism mount point 506 are also shown in this figure.

System Software

Figure 26:
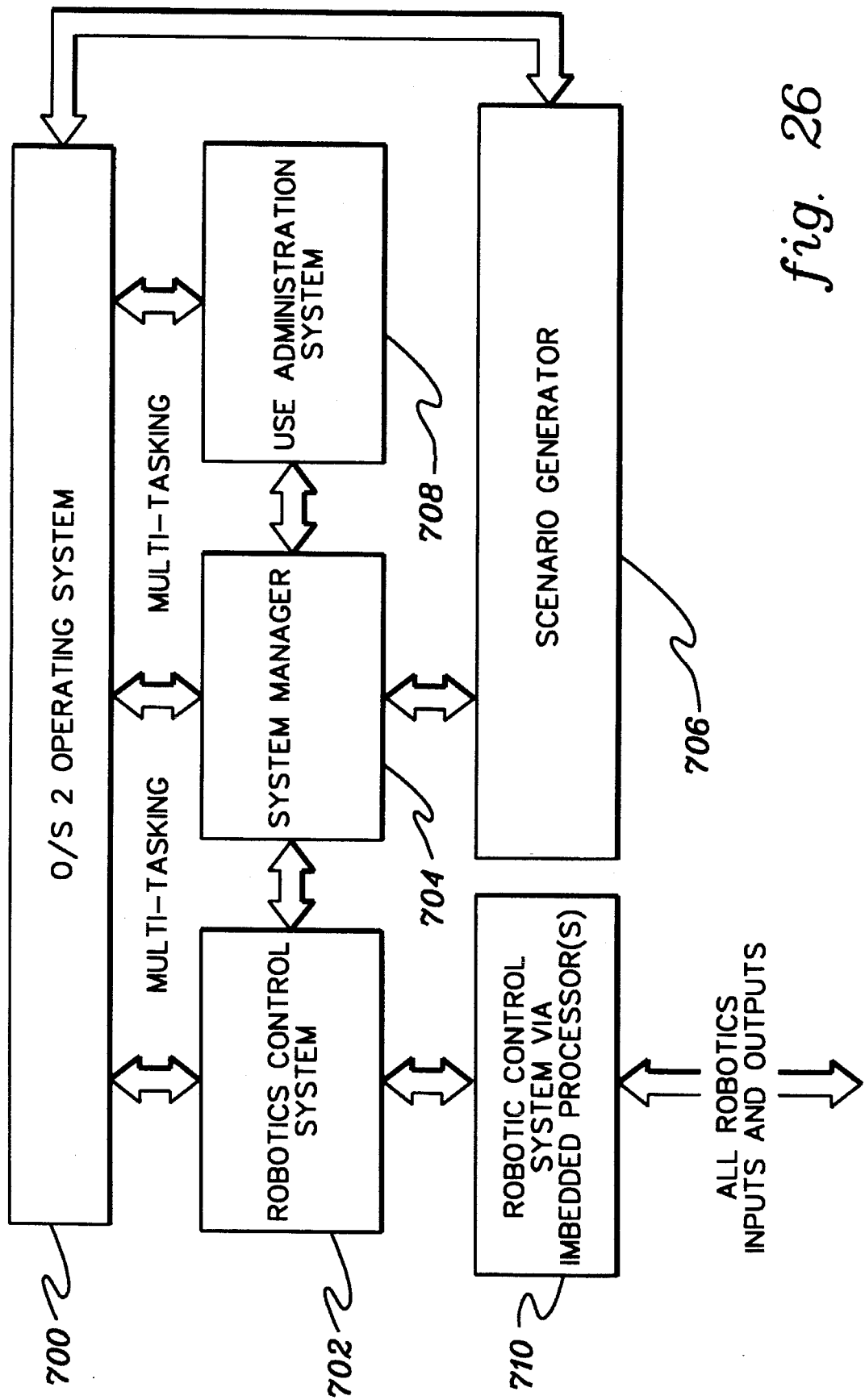
FIG. 26 is a block diagram representation of one embodiment of system software pursuant to the present invention.

Referring to FIG. 26, the system software consists of five major categories as follows:

1) Basic operating system 700 which is the system software foundation on which all resident programs run. This is the O/S-2 system by IBM (a standard and widely used operating system). It is a multi-tasking operating system which is well suited for the simulator's requirements. This program also provides all the basic utility functions to control all system peripherals such as keyboard(s), video monitors, disk drives and printers.

2) Robotics control system 702: This system provides all the basic control, sensing commands and functions to operate the RI. It is resident within the main processing unit as well as resident within "imbedded" microprocessors located on the robotics control card (A to D and D to A modules).

3) System manager 704: This program controls all the major functions of the simulator, such as the command of the RI, the reading of sensing data from the RI, the coordination of events, such as help screen operation, the logging of data resultant from a given simulation scenario, etc. It is not accessible to the user and/or the system administrator since it is an internal program.

4) Scenario generator 706: This system provides the programming utilities for the professional medical administrator (physician) to develop the actual training scenarios for the entire simulator. It provides (in a user friendly manner by making use of "pull-down" menus, point-and-click operations, etc.) the basic utility to create the precise training scenario to be presented to the actual user (person being trained by the simulator). This program is available to the medical professional administrator and not to the "end user" or "institutional administrator/manager." This is an important system security function since the scenario generator creates the actual training "plans" and is responsible for defining and controlling all action and reactions that the simulator will present to the "end user" during a training session. It is the "medical authenticity" creation and control of the entire system.

5) Use administration system 708: This program provides the institutional administrator the basic functions to initialize the simulator, preparing it for use by the end-user, shut the system down after a day or "shift" operation, scheduling the simulator for a day or shift use (name of user, etc.), initialize the self-test feature of the system to verify proper system operation, interchange RI's (full-term, small, preemie, etc.) and test for proper operation, etc. It is an "office administration" function and would be generally used by either a nurse, paramedical staff member or department administrator. This system is also user friendly by making use of pull-downmenus and point-and-click operations as well.

A summary listing of each program and its major functions are as follows:

1) Basic Operating System (IBM):
   a) O/S 2, basic computer utilities.
2) Robotics Control System:
   a) RI motion control
   b) RI sensing
   c) RI sound generation (via synthesizer module)
   d) RI color change control
   e) RI fluid management
   f) RI pneumatics management
   g) Imbedded micro system (Burr Brown/Analog Devices).
3) System Manager:
   a) I/O calls, RI control
   b) File management
   c) Context Sensitive help screen manager
   d) Report generator (to printer)
   e) Scoring system manager.
4) Scenario Generator:
   a) I/O call sub-routines ("pre-packaged motion")
   b) Randomization (type-range) I/O call sub-routines
   c) Help-Screen Composer
   d) Sensing Input reader sub-routine call
   e) Sequence Composer
   f) Printer Report Composer
   g) Audio Output sub-routine call
   h) Sequence Composer, "teaching mode".
5) Use Administration System:
   a) Start-up sequencer
   b) Shut-down sequencer
   c) Use scheduler
   d) Use reporting (to printer)

e) Run Diagnostics and report results.

Robotics Control Software

Robotic control system 710 controls all physical operation of the simulator.

It is a multi-processor system and is monitoring and controlling in excess of 160 points simultaneously in real time.

An operational overview is as follows:

The robotics "script" is derived from the scenario generator's scenario file and down-loaded into the robotics control system. The script is down-loaded in sections such that the scenario file and system manager can monitor the robotics operation.

A single script "element" consists of device I.D., action required or action expected (to be "read").

An example is as follows:

Assume that the scenario generator calls for the head to move rapidly from side to side at a specific point in the simulation.

Figure 27:
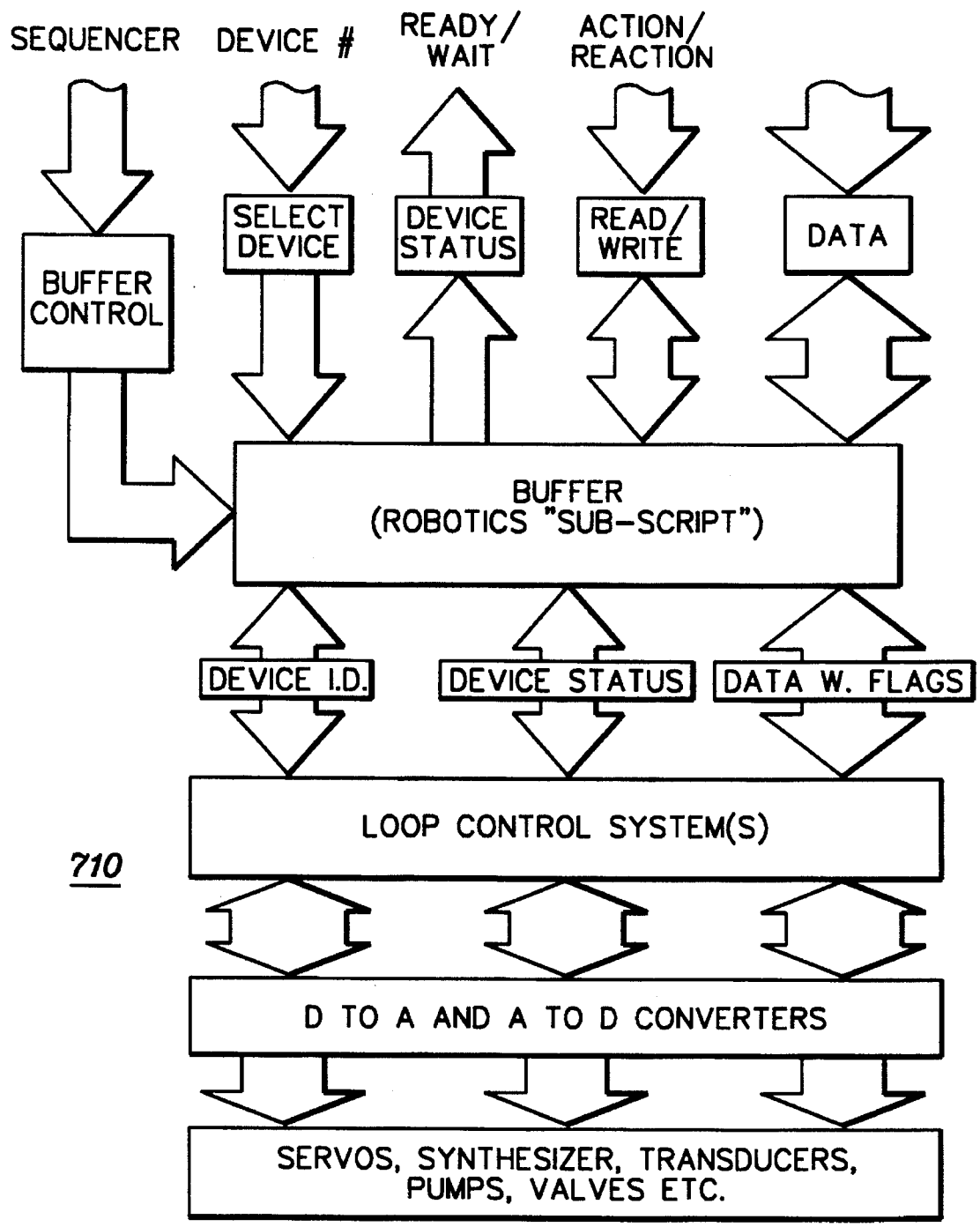
FIG. 27 is a block diagram representation of one embodiment of robotics control software pursuant to the present invention.

The script element will consist of the following data:
a) Device i.d.=head/neck Joint
b) Action Required=Left/Right Motion—Limit to limit
Up-Down Motion+/−25% around center
Motion rate—maximum
Duration—10 seconds
c) Over-Ride Available=Yes This data is then transferred to the loop control processor(s) (see FIG. 27) where the stated instructions are then carried out.

The loop control processor(s) operate autonomously without any assistance from the rest of the system. These are separate and dedicated processors located on the robotics input and output module within the main processor. The structure is generally termed a programmable I/O module, and may comprise any one of numerous commercially available industrial process control systems or standard point controllers.

With 160 such operations available, multi-process control is one of the key elements of the system, hence the autonomous structure.

Robotics Control Software Commands

The following tables set forth the software commands utilized to control the entire system:

The column entitled "COMMAND" defines the desired action of the simulator.

The column entitled "CMD. ID" is the software command name.

The column entitled "RESULT" is the actual action of the simulator required to create the desired robotic and system action.

These are effectively sub-routines called up by the various software commands.

Robotics Control Inputs and Sensing Outputs For Major Sub-Systems

| Command | CMD.ID | Result |
|---|---|---|
| Infant Color Change System (CCS): | | |
| Set to "Blue" | CCS1 | Open U.V. Shutters to maximum |
| Set to "Pallor" | CCS2 | Open U.V. Shutters ~50% |
| Set to "Pink" | CCS3 | Close U.V. Shutters |
| "Modulate" Color | CCS4 | Open/Close Shutters via random pattern ~25% of pre-set positions (as in CCS1, 2 or 3) |
| "Emphasize" Lips to Blue | CCS5 | Open Overhead U.V. Shutters |
| Reset Condition | CCS0 | Close All Shutters |
| Fluid Control System (FCS): | | |
| Reset Condition | FCS0 | All pumps off, all valves set to "fluid-deliver" position(s). Close all pneumatic gate valves in R.I. |
| Initialization Sequence | FCS1 | Set all valves to "Purge" position. Turn on purge pumps. Run purge pumps ~30 seconds. Shut-off purge pumps. Set all valves to "Fluid Deliver" position. Close all pneumatic gate valves in R.I. Prime Fluid Delivery System; (run fluid delivery pumps for ~8 seconds with gate valves closed). |
| Deliver NASAL Fluid: | | |
| To Level 1. | FCS2.1 | Open NASAL gate valves in R.I. Turn on Fluid Delivery Pump #1 for ~3 seconds. Shut-off delivery pump. Close NASAL gate valves. |
| To Level 2. | FCS2.2 | FCS2.1 with pump on for ~6 seconds. |
| To Level 3. | FCS2.3 | FCS2.1 with pump on for ~9 seconds. |
| To Level 4. | FCS2.4 | FCS2.1 with pump on for ~12 seconds. |
| Deliver Mouth & Upper Throat Fluid: | | |
| To Level 1. | FCS3.1 | Open MOUTH gate valve in R.I. Turn on Fluid Delivery Pump #1 for ~6 seconds. Shut-off delivery pump. Close MOUTH gate valve. |
| To Level 2. | FCS3.2 | FCS3.1 with pump on for 9 seconds. |
| To Level 3. | FCS3.3 | FCS3.1 with pump on for 12 seconds. |
| To Level 4. | FCS3.4 | FCS3.1 with pump on for 15 seconds. |
| Deliver Lower Throat Fluid: | | |
| To Level 1. | FCS4.1 | As in FCS3.1 except open lower throat tube gate valve. |
| To Level 2. | FCS4.2 | As in FCS3.2 |
| To Level 3. | FCS4.3 | As in FCS3.3 |
| To Level 4. | FCS4.4 | As in FCS3.4 |
| Deliver ANAL Fluid: | | |
| To Level 1. | FCS5.1 | Open ANAL gate valve. Turn on fluid deliver pump #2 for ~2 seconds. Shut-off delivery pump. Close ANAL gate valve. |
| To Level 2. | FCS5.2 | FCS5.1 with pump on for 4 seconds. |

-continued

| Command | CMD.ID | Result |
|---|---|---|
| To Level 3. | FCS5.3 | FCS5.1 with pump on for 6 seconds. |
| To Level 4. | FCS5.4 | FCS5.1 with pump on for 8 seconds. |
| Heart/Chest Sound Generator (HCG): | | |
| Set Heart Rate: (### Beats/Min.) | HCG1(###) | Access audio synthesizer module in processor and set rate (###) (rate range 0 thru 300 beats/min.). |
| Set Heart Beat Amplitude: (Volume) | HCG2(#) | Set amplitude of audio synthesizer (1 thru 9). |
| Start "Chest Sounds" | HCG3 | Access audio synthesizer in processor and initiate chest sounds. |
| "Chest Sound" Amplitude | HCG4 | As in HCG2(#). |
| Instrument Use Monitoring System (IMS): | | |
| Initialization | IMS0 | Scan all instrument "sense" lines to be sure all items are connected and in place. If item is "missing", display message on VDU (help screen) noting missing item. |
| Scan for Stethoscope Use | IMS1 | "Read" strain sensor on stethoscope tether. If output is present, stethoscope is in use. |
| Scan for PPV Use | IMS2 | As in IMS1 except for PPV device. |
| Scan for Suction Tube Use | IMS3 | As in IMS1 except for Suction Tube Device. |
| Scan for Catheter Use: | | |
| Size (#) 1 | IMS4 | As in IMS1 except for catheter |
| Size (#) 2 | IMS5 | As in IMS1 except for catheter |
| Size (#) 3 | IMS6 | As in IMS1 except for catheter |
| Size (#) 4 | IMS7 | As in IMS1 except for catheter |
| Scan for Linen Use | IMS8 | As in IMSl except for linen |
| Scan for INTUBATION pump on/off | IMS9 | Read pump switch setting |
| Scan for INTUBATION tube use | IMS10 | As in IMS1 except for INTUBATION tube |
| Scan for INTUBATION pump pressure setting | IMS11 | Read pressure level potentiometer setting |
| Scan for LARYNGOSCOPE use | IMS12 | As in IMS1 except for LARYNGOSCOPE |
| Motion Control System; Limbs and Facial Motion (MCS1): | | |
| Initialization | MCS1-0 | Reset all motion servos to "home" position. |
| Motion Level 0 | MCS1-1 | 2% motion on all servos at >1 second cycle rate. Eyes shut, mouth partially open. |
| Motion Level 1 | MSC1-2 | ~10% motion on all servos at >.75 second cycle rate. Eyes partially open/closed at >.75 second cycle rate. Mouth "slow quiver" about partially open position. |
| Motion Level 2 | MCS1-3 | ~30% motion: >.5 second cycle rate (as in MSC1-2). |
| Motion Level 3 | MSC1-4 | ~50% motion (as in MCS1-3). |
| Motion Level 4 | MCS1-5 | ~70% motion: >.3 second cycle rate. |
| Motion Level 5 | MCS1-6 | ~90% motion: >.15 second cycle rate. |
| Head/Neck Only | MCS1-7(#) | # selected is "level" of mtn. |
| Left Arm Only | MSC1-8(#) | # selected is "level" of mtn. |
| Right Arm Only | MSC1-9(#) | # selected in "level" of mtn. |
| Left Leg Only | MSC1-10(#) | # selected in "level" of mtn. |
| Right Leg Only | MSC1-11(#) | # selected in "level" of mtn. |
| Eyes Open | MSC1-12 | As stated. |
| Eyes Closed | MSC1-13 | As stated. |
| Mouth Open | MSC1-14 | As stated. |
| Mouth Closed | MSC1-15 | As stated. |
| Motion Control System; Chest Plate (MCS2): | | |
| Initialization | MCS2-0 | As in MCS1-0 |
| Motion Level 0 | MCS2-1 | ~2% equal motion on all servos @ ~.4 second cycle rate. |
| Motion Level 1 | MCS2-2 | ~10% equal motion; ~.5 second rate. |
| Motion Level 2 | MCS2-3 | ~30% equal motion; ~.4 second rate. |
| Motion Level 3 | MCS2-4 | ~50% equal motion; ~.3 second rate. |
| Motion Level 4 | MCS2-5 | ~70% equal motion; ~.2 second rate. |
| Motion Level 5 | MCS2-6 | ~90% equal motion; ~.15 second rate. |
| Motion Modulation #0 | MCS2-#(0) | No modulation |
| Motion Modulation #1 | MCS2-#(1) | Alternate left/right side |
| Motion Modulation #2 | MCS2-#(2) | Alternate upper/lower. |
| Motion Modulation #3 | MCS2-#(3) | Alternate between MM#2 and MM#3. |
| Motion Modulation #4 | MCS2-#(4) | Randomize. |
| Medication Dispensing System (MDS): | | |
| Initialize | MDS-0 | Sense all six syringes are located in proper drawer slot (via pressure sensing in each drawer slot.) |
| Sense "selection" of specific syringe: #1 thru #6 | MDS-1(#) | Sense for "pressure release" slots 1 thru 6 to determine which syringe has been removed for subsequent use. Each syringe is dedicated to a specific medication as |

| Command | CMD.ID | Result |
|---|---|---|
| | | follows: |
| | | Syringe — Medication |
| | | (1) Epinephrine |
| | | (2) Sodium Bi-carb |
| | | (3) Saline Solution |
| | | (4) Albumin |
| | | (5) Dopamine |
| | | (6) Doputamine |
| Medication Use Monitoring System (MUM): | | |
| Initialize | MUM-0 | Check to see that none of the syringes are depressed (this is a fault check). If registered depressed display message on screen "check syringe #("n")". This is during the system initialization process only. |
| Medication Dispensing | MUM-(#) (n) | "#" relates to the syringe in hand (1 thru 6), "n" relates to the number of syringe depressions enacted by the trainee. Each depression equates to a specific dosage of medication being administered. |
| Pressure Sensing System (PSS): | | |
| Initialize | PSS-0(#) | Read "ambient" pressure level from each transducer and log that value as "pressure reference state". This is the base measurement that the system will use to determine if any specific pressure transducer is activated during a resuscitation scenario. The "#" identifies the specific pressure transducer as follows: |
| | | # — Identity |
| | | 1 thru 6 — Chest Plate Sub System |
| | | 7 thru 10 — Hands and Feet |
| Set Level | PSS-1(#) (n) | This is an internal system function which sets the quiescent level output of each transducer as a "no-activation" reference. |
| Monitor pressure | PSS-2(#) (n) | System reads the output of each pressure transducer. "#" relates to the specific transducer and "n" relates to the pressure level being sensed. The pressure level is monitored as three levels (lo–medium–high). |
| Throat Tube System (TTS): | | |
| Initialize | TTS-0 | Open vocal chord solenoid. Burst fire (10 ms) sense coils and read coil impedance to set quiescent level for "no instrument" condition. |
| Read Coils | TTS-1(#) (N) | This function measures the impedance (Z) of each coil to determine the presence or absence of any instrument insertion during a training scenario. "#" relates to the specific coil being monitored and "N" relates to the measured impedance. This is a go-no-go (on/off) measurement function only. |
| | | Coil # — Coil Location |
| | | 1 & 2 — Nasal Passage |
| | | 3 — Mouth (behind tongue) |
| | | 4 — Upper Trachea (before vocal chords) |
| | | 5 — Lower Trachea (after vocal chords) |
| | | 6 to 8 — Left Bronchus |
| | | 9 to 11 — Right Bronchus |
| | | 12 to 16 — Esophagus |
| Open Vocal Chord | TSS-2 | Opens vocal chord solenoid. |
| Close Vocal Chord | TSS-3 | Closes vocal chord solenoid. |
| Umbilical Stub System: (USS) | | |
| Initialize | USS-0 | Read pressure sensor in umbilical stub for "no instrument insertion" condition. |
| Instrument Insertion | USS-1 | Read pressure transducer for go-no go determination to detect instrument insertion. |
| Vocal Sound Generator (Synthesizer) (VSG): | | |
| Initialize | VSG-0 | All sound outputs off. |
| Cycle | VSG-1 | Sequence through all "voices" for test purposes as follows: |
| | | Vocal Sounds |
| | | VS-1 — Cry, lf (low frequency) |
| | | VS-2 — Cry, mf |
| | | VS-3 — Cry, hf |
| | | VS-4 — Choke, 1 |
| | | VS-5 — Choke, 2 |
| | | VS-6 — Choke, 3 |
| | | VS-7 — Breath, 1 |
| | | VS-8 — Breath, 2 |
| | | VS-(n) — Sound Duration |
| | | VS-(n) (a) — Amplitude (1 thru 4) |
| | | Chest Sounds |
| | | VS-9 — Heart Beat - Soft |
| | | VS-10 — Heart Beat - Medium |
| | | VS-11 — Heart Beat - Loud |
| | | VS-12 — Breath In - (Inhale) |
| | | VS-13 — Breath Out - (Exhale) |
| | | NOTE: Sound rate is controlled by the code access rate from main processor. |
| Sound Select | (See Above) | |
| Output Select | VSG-20 | Vocal Speaker System |

| Command | CMD.ID | Result |
|---|---|---|
| Output Select | VSG-30 | Chest Speaker |

Sample Training Scenario: Basic Flow Diagram (A "simple" scenario has been selected for purposes of description.)

The left hand side of this "Scenario Flow" diagram describes the actions taken by the medical professional being trained on the system while the right hand side describes the trainee actions monitored and actions/responses created by the simulator and presented to the trainee. The simulator's monitoring functions and actions are referenced to the various sub-systems within the simulator. Pease refer to the Sub-System I.D. reference table.

The "Initial Conditions" are the start characteristics assumed during birth and may be considered the "Title" of the training scenario.

Preparation and Simulator Start-Up

First, the Robotic Infant (R.I.) is prepared for the start of a new simulation or "Training Scenario". This consists of the following steps:

1) Depress the "Master Reset" key on the User Keypad. This resets all robotic sub-systems to their initial start-up state. It also checks to see that all instruments, simulated medication vessels, etc. are in proper position and condition to begin a new training session.

2) Remove any simulation fluids that may be remaining from the previous simulation. This is accomplished by simply wiping off the robotic infant and work surface with a clean cloth if required.

3) Place the IAU (Infant Atomizer Unit) over the RI and depress the top panel three or four times. This sprays a coating of distilled water over the infant to simulate the "Web-Born" initial conditions. Once completed remove the IAU.

4) Via the UKP (User-Keypad) and VDU (Visual Display Screen) depress the select scenario key. The VDU will then display a listing of all available training scenarios stored within the system at that time. Using the up-down key on the UKP, roll the "scenario screen" until the desired scenario is within a highlighted "select" window on the VDU. Then depress the "O.K." key. The system then access the scenario file from its disk and begins its "initialization" sequence.

For this example assume the "Full-Term, Prolapsed Cord C/Section and Breach Delivery, Stat Conditions" scenario has been selected.

5) Simulator Response to Scenario Selection:

Upon selection of the above scenario the simulator "initializes" the system as follows;
  a) Sets RI color to "Pallor (pale white) via the CCS.
  b) Inserts fluid into mouth, nasal passages and throat via the FCS.

Upon completion of these two operations the VDU then displays the message "READY TO BEGIN".

The trainee then depresses the "GO" key on the UKP and the simulation begins.

| Scenario Operation Flow Diagram | | | | | |
|---|---|---|---|---|---|
| Trainee Actions | | | System Monitoring & Actions | | |
| Time = 0 (zero) | | | | | |
| | | M | \| | RI motion via MCS1 | level 0 |
| | | S | \| | RI motion via MCS2 | level 0 |
| | | G | \| | Sounds via VSG | level 0 |
| | | | \| | Sounds via HCG | level > 60 |
| Turn Radiant Warmer On | 1 | | | sense turn-on | \| |
| Dry the Infant using | | | | | \| |
| linen | 2 | | | Sense drying motion | \| |
| | | | | via PSS and linen | continue |
| | | | | motion via IMS | MSG |
| Remove Wet Linen | 3 | | | sense "absence of | \| |
| | | | | motion", via PSS and IMS | \| |
| Suction Mouth and Nose | 4 | | | Sense: | \| |
| | | | | Suction tube use via IMS. | \| |
| | | | | Tube location within TTS. | \| |
| | | | | Suction Pump action | \| |
| | | | | via IMS. | \| |
| | | | | time expended. | \| |
| Physical Stimulation | 5 | | | Sense stimulation | \| |
| | | | | via PSS | \| |
| | | | | ((note: MSG (and VSG) are | \| |
| | | | | operational through | \| |
| | | | | entire simulation)) | \| |
| Time = 30 sec. | | | | | |
| Assessment (view infant) | 6 | | | Continue MSG (level 0) | |
| Evaluate (determine what | | | | | |
| is seen) | 7 | | | Continue MSG (level 0) | |
| PPV for 15 to 30 secs. | | | | | |
| (Apply Positive Pressure | | | | | |
| Ventilation to RI via | | | | | |
| hand operated PPV unit | | | | | |
| and tube insertion | | | | | |
| within the RI's throat) | 8 | | | Continue MSG (level 0) | |

-continued

Scenario Operation Flow Diagram

| Trainee Actions | | System Monitoring & Actions |
|---|---|---|
| | | Sense use of PPV via IMS. Sense location of PPV "mouth" via PSS. Continue MSG (level 0). |
| GET HELP (at this point the trainee usually needs personal assistance to continue a "live" resuscitation; however, the simulator only requires that the trainee depress the trainee depress the "GET HELP" key on the UKP to satisfy this requirement | 9 | VDU displays message "HELP HAS ARRIVED". Continue MSG (level 0). |
| Time = 1 min. | | |
| Check Heart Rate | 10 | Continue MSG (level 0 with HCG at 60 beats/min.) Sense stethoscope use via IMS. |
| INTUBATE | 11 | Sense tube use via IMS. Sense tube location via TTS. Continue MSG (level 0). |
| Check Heart Rate Again | 12 | Continue MSG (level 0). Sense stethoscope use via IMS. |
| Chest Compressions for 30 seconds and continue PPV | 13 | Continue MSG (level 0). Sense chest pressure via PSS. Sense use of PPV via IMS. Sense location of PPV "mouth" via PSS. |
| Time = 2.0 min. | | |
| Check heart rate Again | 14 | Continue MSG (level 0 with HCG at 60 beats/min). Sense stethoscope use via IMS. |
| Add Medication: Select medication; (EPI, 1:10 k, 0.1 cc/kg with infant weight assumed to be 3 kg.) and prepare for UV use (umbilical vein) | 15 | Sense MUM. |
| Continue PPV | 16 | Sense. (as in step 13). |
| Continue Chest Compressions | 17 | Sense. (as in step 13). Continue MSG (level 0). |
| Check Heart Rate Again | 18 | MSG and Sense (as in step (14). |
| Place UV line (catheter for umbilical vein insertion) | 19 | Sense catheter selection via IMS. Sense insertion of catheter via USS. Sense (simulated) medication flow via USS. |
| Time = 2 min. 30 sec. | | |
| Check Heart Rate Again | 20 | MSG and Sense (as in step 14). |
| repeat medication | 21 | (as in step 19). |
| Continue PPV | 22 | (as in step 13). |
| Continue Chest Comp | 23 | (as in step 13). |

-continued

Scenario Operation Flow Diagram

| Trainee Actions | | System Monitoring & Actions |
|---|---|---|
| Time = 4.0 min. | | |
| Check Heart Rate Again | 24 | MSG and Sense (as in step (14). |
| Select new medication: NaHCO3 (Sodium Bi-carb) | 25 | Sense MUM |
| Set for following: does = 2 meg/kg of infant wt. density = 4 cc/kg of infant wt. Rate = 12 cc over 2 mins. | 26 | Sense settings of MDS. |
| Continue PPV | 27 | (as in step 13) |
| Continue Chest Comp. | 28 | (as in step 13) |
| Time = 6.0 mins. | | |
| Check Heart Rate Again | 29 | Sense as in step 14. MSG transists to level 2. HCG transists to 180 beats/min. CCS transists from "Pallor" to pale with pink "tinge" (Pallor-pink). |
| Prepare to Give Fluids Set Saline Solution and insertion tube | 30 | Sense IMS |
| Set Insertion Rate: Density = 10 cc/kg. wt. Rate = 30 cc over 5 mins. | 31 | Sense setting of MDS. |
| Insert in Umbilical and begin fluid flow | 32 | Sense tube insertion via USS Sense Fluid Flow via USS. |
| Time 11.0 mins. | | |
| Evaluate Infant (observe) | 33 | MSG transists to level 3. HCG transists to 150 beats/min. CCS transists to pink. |
| Check Heart Rate Again | 34 | Sense as in step 14. MSG at level 3. CCS at Pink. |
| Evaluate Infant (observe) | 35 | As in step 33. |
| END | 36 | VDU displays "SUCCESS!" RPT. provides printed report on simulation performance to trainee. |

SUB-SYSTEM Reference Identification (I.D.) Table (alphabetical order)

| | |
|---|---|
| CCS | Infant Color Change System |
| FCS | Fluid Control System (including pneumatic purge system) |
| HCG | Heart/Chest Sound Generator |
| IAU | Infant Atomizer Unit |
| IMS | Instrument Use Monitoring System |
| MCS1 | Motion Control System, limbs and facial motion (see below) |
| MCS2 | Motion Control System, Chest Plate (see below) |
| MDS | Medication Dispensing System |
| MUM | Medication Use Monitoring System |
| PSS | Pressure Sensing System |

-continued

SUB-SYSTEM Reference Identification (I.D.) Table

| | |
|---|---|
| TTS | Throat Tube System |
| RPT | Report Printer System |
| UKP | Use Keypad System |
| USS | Umbilical Stub System |
| VDU | Visual Display Screen (Help Screen) |
| VSG | Vocal Sound Generator (see below) |

MCS ( and VSG) Levels:

Level 0 = no or absolutely minimal (perceptible) motion and sound.
Level 1 = slight motion and sound.
Level 2 = Below normal motion and sound.
Level 3 = Expected "normal" motion and sound.
Level 4 = Above "normal" motion and sound.

| SUB-SYSTEM Reference Identification (I.D.) Table |
| --- |
| Level 5 = Hyperactive motion and "exaggerated" sound. All MSC levels are "Randomized" (within appropriate anatomical limits) such that no repeating patterns occur. |

Although specific embodiments of the present invention have been illustrated in the accompanying drawings and described in the foregoing detailed description, it will be understood that the invention is not limited to the particular embodiments described herein, but is capable of numerous rearrangements, modifications and substitutions without departing from the scope of the invention. The following claims are intended to encompass all such modifications.

We claim:

1. An interactive human resuscitation training simulator comprising:
   a robotic infant having an intelligent, interactive control mechanism and an outer skin, said outer skin's texture and feel approximating the skin texture and feel of a newborn infant, said intelligent, interactive control mechanism being partially disposed external to said robotic infant and including:
   (i) means for physically simulating within said robotic infant a condition corresponding to a human condition requiring resuscitation;
   (ii) means for detecting and evaluating resuscitation activities on said robotic infant by a student employing the simulator; and
   (iii) means for adjusting the robotic infant's physically simulated condition in response to the student's resuscitation activities as evaluated by said detecting and evaluating means, said adjustment mimicking a predetermined human reaction to resuscitation activity performed on the robotic infant by the student employing the simulator.

2. The simulator of claim 1, wherein said robotic infant has a life-like human appearance and said intelligent, interactive control mechanism provides said robotic infant with life-like human conditions and responses.

3. The simulator of claim 1, further comprising a plurality of simulated human joints disposed within said robotic infant and a motion system for moving said plurality of simulated human joints, said motion system being controlled by said intelligent, interactive control mechanism.

4. The simulator of claim 3, wherein said robotic infant's motion system includes a plurality of linear motion cables connected to said plurality of simulated human joints disposed within said robotic infant.

5. The simulator of claim 4, wherein said robotic infant's motion system includes a plurality of linear servo mechanisms, each linear servo mechanism being coupled to one of said plurality of linear motion cables, said linear servo mechanisms being controlled by said intelligent, interactive control mechanism.

6. The simulator of claim 3, wherein said plurality of simulated joints disposed within said robotic infant include single axis motion joints and dual axis motion joints, said single axis motion joints comprising elbow, wrist, knee and ankle motion joints, and said dual axis motion joints comprising neck, shoulder and hip motion joints.

7. The simulator of claim 6, wherein said robotic infant's plurality of simulated human joints are interconnected by spars and each of said plurality of linear motion cables connects to one of said simulated human joints of said plurality of simulated human joints.

8. The simulator of claim 3, wherein said motion system further includes a chest plate sub-system disposed within said robotic infant, said chest plate sub-system being controlled by said intelligent, interactive control mechanism.

9. The simulator of claim 8, wherein said chest plate system includes a chest plate and a plurality of piston devices coupled thereto, each of said piston devices being coupled to and controlled by said intelligent, interactive control mechanism.

10. The simulator of claim 9, wherein four piston devices are coupled to said chest plate, each of said piston devices being remotely spaced relative to the other of said piston devices such that said intelligent, interactive control mechanism can replicate an undulating chest motion within said robotic infant as part of said android's simulated condition or in response to resuscitation activity detected by said detecting and evaluating means.

11. The simulator of claim 9, wherein said detecting and evaluating means includes at least one pressure transducer supported by said chest plate system for detecting and evaluating external pressure applied to the robotic infant's chest area.

12. The simulator of claim 11, wherein said detecting and evaluating means further comprises a plurality of pressure transducers positioned and supported by said chest plate.

13. The simulator of claim 3, wherein said robotic infant includes a motion system and a mouth assembly and wherein said robotic infant's motion system comprises a first motion cable connected to said mouth assembly to effect opening, closing, partial opening and partial closing of the robotic infant's mouth and a second motion cable connected to a tongue of said mouth assembly for raising and lowering said tongue within said mouth assembly such that movement of the tongue and opening and closing of the mouth are independently controlled by said intelligent, interactive control mechanism.

14. The simulator of claim 3, wherein said robotic infant includes a motion system and left and right eye assemblies, each of said eye assemblies including movable eyelids, and wherein said motion system includes separate motion cables connected to each of said left and right eye assemblies to effect independent opening, closing, partial opening and partial closing of said eye assemblies, said opening, closing, partial opening and partial closing of said eye assemblies being controlled by said intelligent, interactive control mechanism.

15. The simulator of claim 1, further comprising a fluidics system for said robotic infant, said fluidics system being controlled by said intelligent, interactive control mechanism.

16. The simulator of claim 1, further comprising means for simulating a heartbeat within said robotic infant, said heartbeat simulation means being controlled by said intelligent, interactive control mechanism.

17. The simulator of claim 16, wherein said heartbeat simulation means includes a speaker positioned within said robotic infant and said intelligent, interactive control mechanism includes an audio synthesizer coupled to said speaker for producing a heartbeat sound within said robotic infant.

18. The simulator of claim 16, further comprising means for simulating respiration within said robotic infant, said respiration simulation means being controlled by said intelligent, interactive control mechanism.

19. The simulator of claim 19, wherein said robotic infant has a chest area, and wherein said respiration simulation means includes means disposed within said robotic infant for undulating said chest area as a simulation of respiration.

20. The simulator of claim 19, wherein said means for generating undulating motion within said robotic infant includes a chest plate and a plurality of piston devices coupled thereto, each of said piston devices being coupled to and controlled by said intelligent, interactive control mechanism.

21. The simulator of claim 1, wherein said robotic infant includes an umbilical stub and wherein said detecting and evaluating means includes means for detecting the insertion of a medication administration tube into said umbilical stub.

22. The simulator of claim 21, wherein said means for detecting insertion of a medication administration tube into said umbilical stub includes a magnetic proximity detector associated with said umbilical stub, said magnetic proximity detector providing a signal representative of the insertion of the medication administration tube into said umbilical stub.

23. The simulator of claim 1, wherein said robotic infant includes a throat-tube assembly comprising an anatomical simulation of a human throat-tube for laryngoscope viewing.

24. The simulator of claim 23, wherein said throat-tube assembly includes an upper section from a trachea-esophagus junction to a nasal-mouth passage area and a lower section from the trachea-esophagus junction to a distal ends of a left main bronchus, a right main bronchus, and an esophagus.

25. The simulator of claim 24, wherein said distal ends of said left main bronchus, right main bronchus and esophagus terminate at a fluid purge tube for purging fluids from said throat-tube assembly subsequent to completion of a resuscitation simulation.

26. The simulator of claim 24, wherein said throat-tube assembly includes a vocal cord restriction flap reciprocal between an open position and a closed position, said vocal cord restriction flap being controlled by said intelligent, interactive control mechanism to simulate the opening and closing of human vocal cords.

27. The simulator of claim 23, wherein said detecting and evaluating means includes a plurality of magnetic ring sensors encircling sections of said throat-tube assembly for detecting the presence of an inserted instrument into the throat-tube assembly.

28. The simulator of claim 1, wherein said simulator further comprises a skin color change system for said robotic infant, said skin color change system being controlled by said intelligent, interactive control mechanism.

29. The simulator of claim 28, wherein said skin color change system further includes ultraviolet sensitive particles embedded within the external skin of said robotic infant such that when excited by ultra-violet light said ultra-violet sensitive particles change color to a blue tint, thereby creating an illusion of skin color change for the robotic infant.

30. The simulator of claim 1, further comprising a resuscitation workstation, said intelligent, interactive control mechanism being disposed within said resuscitation workstation and said robotic infant being positioned on a support surface of said resuscitation workstation during a resuscitation training simulation.

31. The simulator of claim 30, wherein said resuscitation workstation has an appearance which approximates an actual hospital resuscitation workstation, said resuscitation workstation being equipped with standard resuscitation instruments for use during a resuscitation simulation.

32. The simulator of claim 30, wherein said resuscitation workstation includes a TV monitor system coupled to said intelligent, interactive control mechanism, said control mechanism providing the student employing the simulator with helpful guidance during the resuscitation simulation via the TV monitor system.

33. The simulator of claim 30, wherein said resuscitation workstation includes a keypad for control of starting, stopping and selecting of resuscitation simulation scenarios by the student employing the simulator.

34. The simulator of claim 1, further comprising a virtual reality environment enclosure surrounding said android, said virtual reality environment enclosure including means for simulating a typical working environment during an actual human resuscitation procedure.

35. The simulator of claim 34, wherein said virtual reality environment enclosure is collapsible for storage during intervals of non-use.

36. An interactive human resuscitation training simulator comprising:

a resuscitation workstation having a resuscitation support surface;

an robotic infant having an outer skin with a texture and feel approximately the skin texture and feel of a newborn infant, said robotic infant being positionable upon said resuscitation support surface of said workstation;

an intelligent, interactive control mechanism including:
(i) means for physically simulating within said robotic infant a condition corresponding to a human condition requiring resuscitation, said robotic infant's simulated condition comprising a life-like human condition;
(ii) means for detecting and evaluating resuscitation activities on said robotic infant by a student employing the simulator; and
(iii) means for adjusting said robotic infant's physically simulated condition in response to the student's resuscitation activities as evaluated by said detecting and evaluating means, said adjustment mimicking a predetermined human reaction to resuscitation activity performed on the robotic infant by the student employing the simulator.

37. The simulator of claim 36, further comprising a simulated human joint motion system disposed partially within said robotic infant, said simulated human joint motion system being controlled by said intelligent, interactive control mechanism.

38. The simulator of claim 37, wherein a portion of said robotic infant's simulated human joint motion system and a portion of said intelligent, interactive control mechanism are disposed within said resuscitation workstation, said simulator further comprising means for coupling said portion of said simulated human joint motion system and said portion of said intelligent, interactive control mechanism within said workstation with said robotic infant when disposed on said resuscitation support surface.

39. The simulator of claim 38, wherein said coupling means includes a quick connect and disconnect coupling mechanism for connecting said robotic infant to said workstation.

40. The simulator of claim 39, wherein said quick connect and disconnect coupling mechanism is located in a well disposed within said workstation's resuscitation support surface.

41. The simulator of claim 40, further comprising a fluidics system for said robotic infant, a portion of said fluidics system being disposed within said resuscitation workstation, said fluidics system being controlled by said intelligent, interactive control mechanism, said fluidics system including a quick connect and disconnect coupling mechanism for connecting said workstation portion of said fluidics system with said robotic infant.

42. The simulator of claim 41, further comprising a pneumatics system for controlling the secretion and excretion of fluids from said robotic infant via said fluidics system, at least a portion of said pneumatics system being disposed within said workstation, said portion of said pneumatics system disposed within said workstation being coupled to said robotic infant via a quick connect and disconnect coupling mechanism.

43. The simulator of claim 36, wherein said resuscitation workstation has an appearance which approximates an actual hospital resuscitation workstation, said resuscitation workstation being equipped with a plurality of standard resuscitation instruments for use during a resuscitation simulation.

44. The simulator of claim 43, further comprising a virtual reality environment enclosure surrounding said resuscitation workstation, said virtual reality environment enclosure including means for simulating a typical working environment during an actual human resuscitation procedure.

45. A method for conducting an interactive resuscitation training simulation comprising the steps of:
  (a) providing a robotic infant having an outer skin, said outer skin's texture and feel approximately the skin texture and feel of a newborn infant;
  (b) physically simulating within said robotic infant a condition corresponding to a human condition requiring resuscitation;
  (c) detecting resuscitation activities on said robotic infant by a trainee;
  (d) evaluating in real time the trainee resuscitation activities detected in said step (c); and
  (e) adjusting the robotic infant's condition physically simulated in said step (b) in response to said evaluating step (d), said adjustment in said robotic infant's physically simulated condition mimicking a predetermined human reaction to resuscitation activity performed on the robotic infant by the trainee.

46. The method of claim 45, wherein said simulating step (b) includes simulating an asphyxiation condition within said robotic infant.

47. The method of claim 46, wherein said asphyxiation simulating includes electromechanically moving said robotic infant in a life-like manner mimicking movements of a human suffering from asphyxiation.

48. The method of claim 46, wherein said asphyxiation simulating includes providing audiovisual stimuli about said robotic infant representative of audiovisual environmental conditions typically present during a human resuscitation procedure.

49. The method of claim 46, wherein said asphyxiation simulating includes secreting and excreting fluids from said robotic infant in a life-like manner mimicking secretions and excretions of a human suffering from asphyxiation.

50. The method of claim 46, wherein said asphyxiation simulating includes simulating a heartbeat and respiration within said robotic infant indicative of an asphyxiation condition.

51. The method of claim 46, wherein said asphyxiation simulating includes simulating a color change in an outer skin of said robotic infant representative of an asphyxiation condition.

52. The method of claim 45, further comprising the step of providing a resuscitation workstation having an appearance which approximates an actual hospital resuscitation workstation and equipping said resuscitation workstation with a plurality of standard resuscitation instruments for use during a resuscitation simulation.

53. An interactive human resuscitation training simulator comprising:
  a robotic infant having an intelligent, interactive control mechanism, said intelligent, interactive control mechanism being partially disposed external to said robotic infant and including:
    (i) means for simulating within said robotic infant a condition corresponding to a human condition requiring resuscitation,
    (ii) means for detecting and evaluating resuscitation activities on said robotic infant by a student employing the simulator, and
    (iii) means for adjusting the robotic infant's simulated condition in response to the student's resuscitation activities as evaluated by said detecting and evaluating means, said adjustment mimicking a predetermined human reaction to resuscitation activity performed on the robotic infant by the student employing the simulator; and
  a moisture atomizer for covering said robotic infant with moisture to simulate an infant's appearance following delivery.

54. An interactive human resuscitation training simulator comprising:
  a robotic infant having an intelligent, interactive control mechanism, said intelligent, interactive control mechanism being partially disposed external to said infant and including:
    (i) means for simulating within said robotic infant a condition corresponding to a human condition requiring resuscitation,
    (ii) means for detecting and evaluating resuscitation activities on said robotic infant by a student employing the simulator, and
    (iii) means for adjusting the robotic infant's simulated condition in response to the student's resuscitation activities as evaluated by said detecting and evaluating means, said adjustment mimicking a predetermined human reaction to resuscitation activity performed on the robotic infant by the student employing the simulator; and
  means for secreting two distinct fluids from said robotic infant, a first one of said two fluids being secreted from a nasal opening and a mouth opening in said robotic infant and a second one of said two fluids being excreted from an anal passage in said robotic infant.

55. The simulator of claim 54, wherein said fluidics system includes means for purging fluid from within said robotic infant subsequent to a resuscitation simulation exercise.

56. The simulator of claim 54, wherein said fluidics system includes a first container for holding said first fluid and a second container for holding said second fluid, said first and second containers being disposed external to said robotic infant.

57. The simulator of claim 56, wherein said fluidics system includes a first pump mechanism disposed external to said robotic infant for pumping said first fluid from said first container to said robotic infant for secretion from said robotic infant's nasal and mouth passages, and a second pump mechanism disposed external to said robotic infant for pumping said second fluid from said second container to said robotic infant for secretion from said robotic infant's anal passage.

58. The simulator of claim 57, wherein said fluidics system includes a fluidics connector coupled between said robotic infant and said external first pump and second pump mechanisms, said fluidics connector allowing connecting and disconnecting of said robotic infant from said first pump mechanism and said second mechanism of said fluidics system.

59. The simulator of claim 58, wherein said fluidics system includes two gate valves, a first one of said gate valves being disposed between said first pump mechanism and said fluidics connector, and a second one of said gate valves being disposed between said second pump mechanism and said fluidics connector, said pump mechanisms and said gate valves each being controlled by said intelligent, interactive control mechanism.

60. The simulator of claim 56, wherein said first fluid and said second fluid of said fluidics system comprise teflon based emulsions.

61. An interactive human resuscitation training simulator comprising:
  a robotic infant having an intelligent, interactive control mechanism, said intelligent, interactive control mechanism being partially disposed external to said robotic infant and including:
    (i) means for simulating within said robotic infant a condition corresponding to a human condition requiring resuscitation,
    (ii) means for detecting and evaluating resuscitation activities on said robotic infant by a student employing the simulator, and
    (iii) means for adjusting the robotic infant's simulated condition in response to the student's resuscitation activities as evaluated by said detecting and evaluating means, said adjustment mimicking a predetermined human reaction to resuscitation activity performed on the robotic infant by the student employing the simulator;
  a fluidics system for said robotic infant, said fluidics system being controlled by said intelligent, interactive control mechanism; and
  a pneumatics system for controlling fluid secretion and excretion from said robotic infant, said pneumatics system being controlled by said intelligent, interactive control mechanism.

62. The simulator of claim 61, wherein said pneumatic system includes a plurality of pneumatic gate valves, each of said gate valves being disposed so as to control fluid flow secretion and excretion from said robotic infant via said fluidics system.

63. The simulator of claim 62, wherein said pneumatic gate valves are disposed external to said robotic infant.

64. An interactive human resuscitation training simulator comprising:
  a robotic infant having an intelligent, interactive control mechanism and an outer skin, said intelligent, interactive control mechanism being partially disposed external to the robotic infant and including:
    (i) means for simulating within said robotic infant a condition corresponding to a human condition requiring resuscitation,
    (ii) means for detecting and evaluating resuscitation activities on said robotic infant by a student employing the simulator, and
    (iii) means for adjusting the robotic infant's simulated condition in response to the student's resuscitation activities as evaluated by said detecting and evaluating means, said adjustment mimicking a predetermined human reaction to resuscitation activity performed on the robotic infant by the student employing the simulator; and
  a skin color change system for said robotic infant, including an ultra-violet lighting system external to said robotic infant, said ultra-violet lighting system being controlled by said intelligent, interactive control mechanism.

65. The simulator of claim 64, wherein said robotic infant includes a pair of lips, and wherein said skin color change system further includes color changeable strips positioned to form said pair of lips, said color change strips changing color with a change in current through said strips, said current through said strips being provided and controlled by said intelligent, interactive control mechanism.

66. An interactive human resuscitation training simulator comprising:
  an android having an intelligent, interactive control mechanism, said intelligent, interactive control mechanism including:
    (i) means for simulating within said android a condition corresponding to a human condition requiring resuscitation,
    (ii) means for detecting and evaluating resuscitation activities on said android by a student employing the simulator, and
    (iii) means for adjusting the android's simulated condition in response to the student's resuscitation activities as evaluated by said detecting and evaluating means, said adjustment mimicking a predetermined human reaction to resuscitation activity performed on the android by the student employing the simulator; and
  a virtual reality environment enclosure surrounding said android, said virtual reality environment enclosure including a first audiovisual system and a second audiovisual system, said first audiovisual system and said second audiovisual system being disposed within said enclosure so as to generate a visual and an audio environment about said android representative of a typical working environment during an actual resuscitation process.

67. The simulator of claim 66, wherein said first and second audiovisual systems each include a large screen projection TV.

68. The simulator of claim 67, wherein said virtual reality environment enclosure includes a video and stereo audio playback system, said video and stereo audio playback system being controlled by said intelligent, interactive control mechanism.

* * * * *

UNITED STATES PATENT AND TRADEMARK OFFICE
CERTIFICATE OF CORRECTION

PATENT NO. : 5,509,810
DATED : April 23, 1996
INVENTOR(S) : Schertz et al.

It is certified that error appears in the above-indentified patent and that said Letters Patent is hereby corrected as shown below:

Column 30, line 64, "The simulator of claim 19" should read "The simulator of claim 18".

Signed and Sealed this

First Day of October, 1996

Attest:

BRUCE LEHMAN

Attesting Officer   Commissioner of Patents and Trademarks